US012631854B2

(12) United States Patent
Yan et al.

(10) Patent No.: US 12,631,854 B2
(45) Date of Patent: May 19, 2026

(54) CAMERA OPTICAL LENS

(71) Applicant: Changzhou AAC Raytech Optronics Co., Ltd., Changzhou (CN)

(72) Inventors: Junjie Yan, Shenzhen (CN); Jia Chen, Shenzhen (CN)

(73) Assignee: Changzhou AAC Raytech Optronics Co., Ltd., Changzhou (CN)

( * ) Notice: Subject to any disclaimer, the term of this patent is extended or adjusted under 35 U.S.C. 154(b) by 741 days.

(21) Appl. No.: 17/879,787

(22) Filed: Aug. 3, 2022

(65) Prior Publication Data

US 2023/0185058 A1 Jun. 15, 2023

(51) Int. Cl.
*G02B 9/64* (2006.01)
*G02B 13/00* (2006.01)

(52) U.S. Cl.
CPC .......... *G02B 9/64* (2013.01); *G02B 13/0045* (2013.01)

(58) Field of Classification Search
CPC .. G02B 9/64; G02B 13/0045; G02B 13/0015; G02B 13/06
USPC .......................................... 359/755
See application file for complete search history.

(56) References Cited

U.S. PATENT DOCUMENTS

2019/0187414 A1* 6/2019 Zhang ...................... G02B 9/62
2021/0063696 A1* 3/2021 Kamada ................... G02B 9/64

* cited by examiner

*Primary Examiner* — Angela M. Medich
(74) *Attorney, Agent, or Firm* — Wiersch Law Group

(57) ABSTRACT

A camera optical lens includes, from an object side to an image side: a first lens with a positive refractive power; a second lens with a negative refractive power; a third lens; a fourth lens; a fifth lens with a positive refractive power; a sixth lens with a positive refractive power; a seventh lens with a negative refractive power. The camera optical lens satisfies the conditions of $-8.00 \leq f2/f \leq -2.50$, $2.50 \leq (R5+R6)/(R5-R6) \leq 30.00$ and $R8/R7 \leq -1.50$. The camera optical lens of the present disclosure has excellent optical performances, and meanwhile can meet design requirements of a wide-angle, a large aperture and ultra-thin.

10 Claims, 15 Drawing Sheets

10

CAMERA OPTICAL LENS

TECHNICAL FIELD

The present disclosure relates to an optical lens, particular, to a camera optical lens suitable for handheld devices, such as smart phones and digital cameras, and imaging devices, such as monitors or PC lenses.

BACKGROUND

With the emergence of smart phones in recent years, the demand for miniature camera lens is increasing day by day, and as the progress of the semiconductor manufacturing technology makes the pixel size of the photosensitive devices become smaller, plus the current development trend of electronic products towards better functions and thinner and smaller dimensions, miniature camera lens with good imaging quality therefore have become a mainstream in the market.

In order to obtain better imaging quality, the lens that is traditionally equipped in mobile phone cameras adopts a three-piece, four-piece, or five-piece lens structure. Also, with the development of technology and the increase of the diverse demands of users, and as the pixel area of photosensitive devices is becoming smaller and smaller and the requirement of a system on the imaging quality is improving constantly, although the seven-piece lens already has good optical performance, its focal power, lens spacing and lens shape are still unreasonable, resulting in the lens structure still cannot meet the design requirements of a large aperture, a wide-angle and small height while having good optical performance.

Therefore, it is necessary to provide a camera optical lens that has better optical performance and also meets design requirements of a wide-angle, a large aperture and ultra-thin.

SUMMARY

In the present invention, a camera optical lens has excellent optical characteristics with ultra-thin, a large aperture and a wide angle.

The present disclosure provides a camera optical lens including, from an object side to an image side: a first lens with a positive refractive power; a second lens with a negative refractive power; a third lens; a fourth lens; a fifth lens with a positive refractive power; a sixth lens with a positive refractive power; a seventh lens with a negative refractive power; and wherein the camera optical lens satisfies the conditions of $-8.00 \leq f2/f \leq -2.50$, $2.50 \leq (R5+R6)/(R5-R6) \leq 30.00$, and $R8/R7 \leq -1.50$. Herein f denotes a focal length of the camera optical lens; f2 denotes a focal length of the second lens; R5 denotes a curvature radius of an object-side surface of the third lens; R6 denotes a curvature radius of an image-side surface of the third lens; R7 denotes a curvature radius of an object-side surface of the fourth lens; and R8 denotes a curvature radius of an image-side surface of the fourth lens.

The camera optical lens further satisfies conditions of $3.00 \leq f5/f6 \leq 8.00$ and $R14/R13 \geq 2.00$. Herein f5 denotes a focal length of the fifth lens; f6 denotes a focal length of the sixth lens; R13 denotes a curvature radius of an object-side surface of the seventh lens; and R14 denotes a curvature radius of an image-side surface of the seventh lens.

Further, an object-side surface of the first lens is convex in a paraxial region, and the image-side surface of the first lens is concave in the paraxial region, the camera optical lens further satisfies the conditions of $0.44 \leq f1/f \leq 1.57$, $-3.89 \leq (R1+R2)/(R1-R2) \leq -1.00$, and $0.07 \leq d1/TTL \leq 0.22$. Herein f1 denotes a focal length of the first lens; R1 denotes a curvature radius of an object-side surface of the first lens; R2 denotes a curvature radius of an image-side surface of the first lens; d1 denotes an on-axis thickness of the first lens; and TTL denotes a total optical length from the object-side surface of the first lens to an image surface of the camera optical lens along an optical axis.

Further, the image-side surface of the second lens is concave in the paraxial region, the camera optical lens further satisfies the conditions of $0.49 \leq (R3+R4)/(R3-R4) \leq 6.78$ and $0.02 \leq d3/TTL \leq 0.07$. Herein R3 denotes a curvature radius of an object-side surface of the second lens; R4 denotes a curvature radius of an image-side surface of the second lens; d3 denotes an on-axis thickness of the second lens; and TTL denotes a total optical length from an object-side surface of the first lens to an image surface of the camera optical lens along an optical axis.

Further, the camera optical lens further satisfies the conditions of: $-86.98 \leq f3/f \leq 1071.79$ and $0.02 \leq d5/TTL \leq 0.06$. Herein f3 denotes a focal length of the third lens; d5 denotes an on-axis thickness of the third lens; and TTL denotes a total optical length from an object-side surface of the first lens to an image surface of the camera optical lens along an optical axis.

The camera optical lens further satisfies the conditions of: $-281.12 \leq f4/f \leq 172.61$, $-1.99 \leq (R7+R8)/(R7-R8) \leq -0.15$, and $0.03 \leq d7/TTL \leq 0.10$. Herein f4 denotes a focal length of the fourth lens; d7 denotes an on-axis thickness of the fourth lens; and TTL denotes a total optical length from an object-side surface of the first lens to an image surface of the camera optical lens along an optical axis.

Further, an object-side surface of the fifth lens is convex in a paraxial region, and an image-side surface of the fifth lens is concave in the paraxial region, the camera optical lens further satisfies the conditions of $2.35 \leq f5/f \leq 15.17$, $-11.48 \leq (R9+R10)/(R9-R10) \leq -2.60$, and $0.03 \leq d9/TTL \leq 0.10$. Herein f5 denotes a focal length of the fifth lens; R9 denotes a curvature radius of the object-side surface of the fifth lens; R10 denotes a curvature radius of the image-side surface of the fifth lens; d9 denotes an on-axis thickness of the fifth lens; and TTL denotes a total optical length from the object-side surface of the first lens to an image surface of the camera optical lens along an optical axis.

Further, an object-side surface of the sixth lens is convex in a paraxial region, and an image-side surface of the sixth lens is concave in the paraxial region, the camera optical lens further satisfies the conditions of $0.50 \leq f6/f \leq 2.35$, $-9.21 \leq (R11+R12)/(R11-R12) \leq -2.57$, and $0.02 \leq d11/TTL \leq 0.08$. Herein f6 denotes a focal length of the sixth lens; R11 denotes a curvature radius of the object-side surface of the sixth lens; R12 denotes a curvature radius of the image-side surface of the sixth lens; d11 denotes an on-axis thickness of the sixth lens; and TTL denotes a total optical length from an object-side surface of the first lens to an image surface of the camera optical lens along an optical axis.

Further, an object-side surface of the seventh lens is concave in a paraxial region, and an image-side surface of the seventh lens is convex in the paraxial region, the camera optical lens further satisfies the conditions of $-2.06 \leq f7/f \leq -0.48$, $-5.97 \leq (R13+R14)/(R13-R14) \leq -0.67$, and $0.03 \leq d13/TTL \leq 0.13$. Herein f7 denotes a focal length of the seventh lens; R13 denotes a curvature radius of the object-side surface of the seventh lens; R14 denotes a curvature radius of the image-side surface of the seventh lens; d13 denotes an on-axis thickness of the seventh lens; and TTL denotes a total optical length from an object-side surface of the first lens to an image surface of the camera optical lens along an optical axis.

Further, at least one of the first lens, the third lens, the fourth lens, the fifth lens, the sixth lens and the seventh lens is made of glass.

Advantageous effects of the present disclosure are that, the camera optical lens has excellent optical performances, and also has a wide-angle and is ultra-thin. The camera optical lens is especially suitable for mobile camera lens components and WEB camera lens composed of high pixel CCD, CMOS.

BRIEF DESCRIPTION OF DRAWINGS

In order to more clearly illustrate the technical solutions in the embodiments of the present disclosure, the following will briefly describe the accompanying drawings used in the description of the embodiments. Obviously, the accompanying drawings in the following description are only some embodiments of the present disclosure. For a person of ordinary skill in the art, other drawings may be obtained from these drawings without creative work.

DETAILED DESCRIPTION OF EMBODIMENTS

To make the objectives, technical solutions, and advantages of the present disclosure clearer, embodiments of the present disclosure are described in detail with reference to accompanying drawings in the following. A person of ordinary skill in the art should understand that, in the embodiments of the present disclosure, many technical details are provided to make readers better understand the present disclosure. However, even without these technical details and any changes and modifications based on the following embodiments, technical solutions required to be protected by the present disclosure may be implemented.

Embodiment 1

Figure 1:
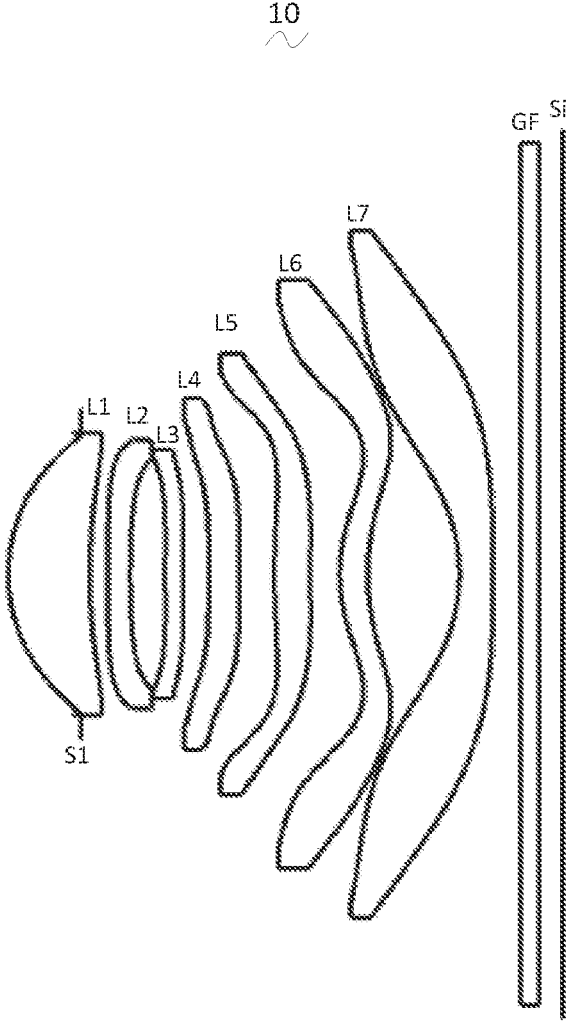
FIG. 1 is a schematic diagram of a structure of a camera optical lens according to Embodiment 1 of the present disclosure.

Referring to the drawings, the present disclosure provides a camera optical lens 10. FIG. 1 is a schematic diagram of a structure of a camera optical lens 10 according to Embodiment 1 of the present disclosure. The camera optical lens 10 includes seven lenses. Specifically, a left side is an object side, a right side is an image side, the camera optical lens 10 includes, from the object side to the image side: an aperture S1, a first lens L1, a second lens L2, a third lens L3, a fourth lens L4, a fifth lens L5, a sixth lens L6 and a seventh lens L7. An optical element such as an optical filter (GF) may be arranged between the seventh lens L7 and an image surface Si.

In the embodiment, the first lens L1, the third lens L3, the fourth lens L4, the fifth lens L5, the sixth lens L6 and the seventh lens L7 are all made of glass material, the second lens L2 is made of plastic. In other embodiments, each lens may also be made of other materials.

In the embodiment, a focal length of the camera optical lens 10 is defined as f, a focal length of the second lens L2 is defined as f2, and the camera optical lens 10 satisfies a condition of $-8.00 \leq f2/f \leq -2.50$, which specifies a ratio of the focal length f2 of the second lens L2 to the focal length f of the camera optical lens 10. Within this range, field curvature of the camera optical lens 10 is effectively balanced, so that field curvature offset of a central field of view is less than 0.01 mm.

A curvature radius of an object-side surface of the third lens is defined as R5, a curvature radius of an image-side surface of the third lens is defined as R6, and the camera optical lens 10 further satisfies a condition of $2.50 \leq (R5+R6)/(R5-R6) \leq 30.00$, which specifies a shape of the third lens L3. Within this range, a deflection degree of light is reduced to effectively correct chromatic aberrations, and the chromatic aberrations (LC) is made to be less than or equal to 2.0 μm.

A curvature radius of an object-side surface of the fourth lens L4 is defined as R7, a curvature radius of an image-side surface of the fourth lens L4 is defined as R8, and the camera optical lens 10 further satisfies a condition of $R8/R7 \leq -1.50$, which specifies a shape of the fourth lens L4. Within this range, it is beneficial to correct astigmatism and distortion of the camera optical lens 10, so that the distortion is less than or equal to 3.0% and possibility of generating vignetting is further reduced.

A focal length of the fifth lens L5 is defined as f5, a focal length of the sixth lens L6 is defined as f6, and the camera optical lens 10 further satisfies a condition of $3.00 \leq f5/f6 \leq 8.00$, which specifies a ratio of the focal length f5 of the fifth lens L5 to the focal length f6 of sixth lens L6. By a reasonable distribution of the focal length, the camera optical lens 10 has an excellent imaging quality and a lower sensitivity.

A curvature radius of an object-side surface of the seventh lens L7 is defined as R13, a curvature radius of an image-side surface of the seventh lens L7 is defined as R14, and the camera optical lens 10 further satisfies a condition of R14/R13≥2.00, which specifies a shape of the seventh lens L7. Within this range, it is beneficial to correct the aberrations of off-axis angle of view.

In the embodiment, an object-side surface of the first lens L1 is convex in a paraxial region, and an image-side surface of the first lens L1 is concave in the paraxial region. The first lens L1 has a positive refractive power. In other embodiments, the object-side surface and the image-side surface of the first lens L1 may also be set to other concave or convex distribution situations.

The focal length of the first lens L1 is denoted as f1, and the camera optical lens 10 satisfies a condition of 0.44≤f1/f≤1.57, which specifies a ratio of the focal length of the first lens L1 to the focal length of the camera optical lens 10. Within this range, the first lens L1 has a suitable positive refractive power, which is beneficial to reduce aberrations of the camera optical lens 10 and also beneficial for ultra-thinness and wide-angle development. As an improvement, a following relationship is satisfied: 0.70≤f1/f≤1.25.

A curvature radius of the object-side surface of the first lens L1 is defined as R1, a curvature radius of the image-side surface of the first lens L1 is defined as R2, and the camera optical lens 10 further satisfies a condition of −3.89≤(R1+R2)/(R1−R2)≤−1.00. By reasonably controlling a shape of the first lens L1, so that the first lens L1 can effectively correct a spherical aberration of the camera optical lens 10. As an improvement, a following relationship is satisfied: −2.43≤(R1+R2)/(R1−R2)≤−1.25.

A total optical length from the object-side surface of the first lens L1 to an image surface of the camera optical lens 10 along an optical axis is defined as TTL, and the camera optical lens 10 satisfies a condition of 0.07≤d1/TTL≤0.22. Within this range, it is beneficial for achieving ultra-thin. As an improvement, a following relationship is satisfied: 0.11≤d1/TTL≤0.18.

In the embodiment, an object-side surface of the second lens L2 is convex in the paraxial region, and an image-side surface of the second lens L2 is concave in the paraxial region. The second lens L2 has a negative refractive power. In other embodiments, the object-side surface and the image-side surface of the second lens L2 may also be set to other concave or convex distribution situations.

A curvature radius of the object-side surface of the second lens L2 is defined as R3, a curvature radius of the image-side surface of the second lens L2 is defined as R4, and the camera optical lens 10 further satisfies a condition of 0.49≤(R3+R4)/(R3−R4)≤6.78, which specifies a shape of the second lens L2. Within this range, with the development of the camera optical lens 10 toward to ultra-thinness and wide-angle, it is beneficial to correct a problem of axial chromatic aberrations. As an improvement, a following relationship is satisfied: 0.78≤(R3+R4)/(R3−R4)≤5.43.

An on-axis thickness of the second lens L2 is defined as d3, and the camera optical lens 10 further satisfies a condition of 0.02≤d3/TTL≤0.07. Within this range, it is beneficial for achieving ultra-thin. As an improvement, a following relationship is satisfied: 0.03≤d3/TTL≤0.05.

In the embodiment, the object-side surface of the third lens L3 is convex in the paraxial region, and the image-side surface of the third lens L3 is concave in the paraxial region. The third lens L3 has a negative refractive power. In other embodiments, the object-side surface and the image-side surface of the third lens L3 may also be set to other concave or convex distribution situations.

The focal length of the third lens L3 is denoted as f3, and the camera optical lens 10 further satisfies a condition of −86.98≤f3/f≤1071.79. Through a reasonable distribution of focal power, the camera optical lens 10 has better imaging quality and lower sensitivity. As an improvement, a following relationship is satisfied: −54.36≤f3/f≤857.43.

An on-axis thickness of the third lens L3 is defined as d5, and the camera optical lens 10 further satisfies a condition of 0.02≤d5/TTL≤0.06. Within this range, it is beneficial for achieving ultra-thin. As an improvement, a following relationship is satisfied: 0.03≤d5/TTL≤0.05.

In the embodiment, the object-side surface of the fourth lens L4 is concave in the paraxial region, and the image-side surface of the fourth lens L4 is concave in the paraxial region. The fourth lens L4 has a negative refractive power. In other embodiments, the object-side surface and the image-side surface of the fourth lens L4 may also be set to other concave or convex distribution situations.

The focal length of the fourth lens L4 is denoted as f4, and the camera optical lens 10 further satisfies a condition of −281.12≤f4/f≤172.61. Through a reasonable distribution of focal power, the camera optical lens 10 has better imaging quality. As an improvement, a following relationship is satisfied: −175.70≤f4/f≤138.08.

The camera optical lens 10 further satisfies a condition of −1.99≤(R7+R8)/(R7−R8)≤−0.15, which specifies a shape of the fourth lens L4. Within this range, a development towards ultra-thin and a wide-angle lens would facilitate correcting a problem of an off-axis aberration. As an improvement, a following relationship is satisfied: −1.24≤(R7+R8)/(R7−R8)≤−0.18.

An on-axis thickness of the fourth lens L4 is d7, and the camera optical lens 10 further satisfies a condition of 0.03≤d7/TTL≤0.10. Within this range, it is beneficial for achieving ultra-thin. The camera optical lens 10 further satisfies a condition of 0.04≤d7/TTL≤0.08.

In the embodiment, an object-side surface of the fifth lens L5 is convex in the paraxial region, an image-side surface of the fifth lens L5 is concave in the paraxial region. The fifth lens L5 has a positive refractive power. In other embodiments, the object-side surface and the image-side surface of the fifth lens L5 may also be set to other concave or convex distribution situations.

The camera optical lens 10 further satisfies a condition of 2.35≤f5/f≤15.17. A limitation of the fifth lens L5 may effectively make a light angle of the camera optical lens 10 smooth and reduce tolerance sensitivity. As an improvement, a following relationship is satisfied: 3.76≤f5/f≤12.14.

A center curvature radius of the object side surface of the fifth lens L5 is denoted as R9, a center curvature radius of the image side surface of the fifth lens L5 is denoted R10, and the camera optical lens 10 further satisfies a condition of −11.48≤(R9+R10)/(R9−R10)≤−2.60, which specifies a shape of the fifth lens L5. Within this range, a development towards ultra-thin and a wide-angle lens would facilitate correcting a problem of an off-axis aberration. As an improvement, a following relationship is satisfied: −7.17≤(R9+R10)/(R9−R10)≤−3.25.

An on-axis thickness of the fifth lens L5 is d9, and the camera optical lens 10 further satisfies a condition of 0.03≤d9/TTL≤0.10. Within this range, it is beneficial for achieving ultra-thin. The camera optical lens 10 further satisfies a condition of 0.05≤d9/TTL≤0.08.

In the embodiment, an object-side surface of the sixth lens L6 is convex in the paraxial region, and an image-side surface of the sixth lens L6 is concave in the paraxial region. The sixth lens L6 has a positive refractive power. In other embodiments, the object-side surface and the image-side surface of the sixth lens L6 may also be set to other concave or convex distribution situations.

The focal length of the sixth lens L6 is denoted as f6, and the camera optical lens 10 further satisfies a condition of 0.50≤f6/f≤2.35. Within this range, a limitation of the sixth lens L6 may effectively make a light angle of the camera optical lens 10 smooth and reduce tolerance sensitivity. As an improvement, a following relationship is satisfied: 0.79≤f6/f≤1.88.

A center curvature radius of the object side surface of the sixth lens L6 is denoted as R11, a center curvature radius of the image side surface of the sixth lens L6 is denoted R12, and the camera optical lens 10 further satisfies a condition of −9.21≤(R11+R12)/(R11−R12)≤−2.57, which specifies a shape of the sixth lens L6. Within this range, a development towards ultra-thin and a wide-angle lens would facilitate correcting a problem of an off-axis aberration. As an improvement, a following relationship is satisfied: −5.76≤ (R11+R12)/(R11−R12)≤−3.21.

An on-axis thickness of the sixth lens L6 is d11, and the camera optical lens 10 further satisfies a condition of 0.02≤d11/TTL≤0.08. Within this range, it is beneficial for achieving ultra-thin. The camera optical lens 10 further satisfies a condition of 0.04≤d11/TTL≤0.07.

In the embodiment, the object-side surface of the seventh lens L7 is concave in the paraxial region, and the image-side surface of the seventh lens L7 is convex in the paraxial region. The seventh lens L7 has a negative refractive power. In other embodiments, the object-side surface and the image-side surface of the seventh lens L7 may also be set to other concave or convex distribution situations.

The focal length of the seventh lens L7 is denoted as f7, and the camera optical lens 10 further satisfies a condition of −2.06≤f7/f≤−0.48. Within this range, a limitation of the seventh lens L7 may effectively make a light angle of the camera optical lens 10 smooth and reduce tolerance sensitivity. As an improvement, a following relationship is satisfied: −1.29≤f7/f≤−0.60.

the camera optical lens 10 further satisfies a condition of −5.97≤(R13+R14)/(R13−R14)≤−0.67, which specifies a shape of the seventh lens L7. Within this range, a development towards ultra-thin and a wide-angle lens would facilitate correcting a problem of an off-axis aberration. As an improvement, a following relationship is satisfied: −3.73≤ (R13+R14)/(R13−R14)≤−0.84.

An on-axis thickness of the seventh lens L7 is d13, and the camera optical lens 10 further satisfies a condition of 0.03≤d13/TTL≤0.13. Within this range, it is beneficial for achieving ultra-thin. The camera optical lens 10 further satisfies a condition of 0.05≤d13/TTL≤0.11.

In the embodiment, the total optical length of the camera optical lens 10 is denoted as TTL, the total optical length TTL is less than or equal to 6.88 mm. Within this range, it is beneficial for achieving ultra-thin. As an improvement, the total optical length TTL is less than or equal to 6.57 mm.

With such a design, the total optical length TTL of the camera optical lens 10 can be shortened as much as possible, and the characteristics of miniaturization can be maintained.

In the embodiment, an image height of the camera optical lens 10 is defined as IH, and the camera optical lens 10 further satisfies a condition of TTL/IH≤1.23, which is beneficial for achieving ultra-thin.

An F number of the camera optical lens 10 is defined as FNO. The camera optical lens 10 further satisfies a condition of FNO≤1.70. When the condition is satisfied, the camera optical lens 10 could have a large aperture and excellent optical performances.

A field of view of the camera optical lens 10 in a diagonal direction is defined as FOV, and the camera optical lens 10 further satisfies a condition of FOV≥84.00°, which specifies a range of the field of view of the camera optical lens 10, so that the camera optical lens 10 has a wide-angle.

When satisfying above conditions, the camera optical lens 10 has excellent optical performances, and meanwhile can meet design requirements of a wide-angle and ultra-thin. According the characteristics of the camera optical lens 10, it is particularly suitable for a mobile camera lens component and a WEB camera lens composed of high pixel CCD, CMOS.

In the following, embodiments will be used to describe the camera optical lens 10 of the present disclosure. The symbols recorded in each embodiment will be described as follows. The focal length, on-axis distance, curvature radius, on-axis thickness, inflexion point position, and arrest point position are all in units of mm.

TTL: Optical length (the total optical length from the object-side surface of the first lens L1 to the image surface Si of the camera optical lens along the optical axis) in mm.

The F number (FNO) means a ratio of an effective focal length of the camera optical lens to an entrance pupil diameter (ENPD).

In addition, inflexion points and/or arrest points can be arranged on the object-side surface and the image-side surface of the lens, so as to satisfy the demand for high quality imaging. The description below can be referred for specific implementations.

Table 1 and Table 2 show design data of the camera optical lens 10 shown in FIG. 1.

TABLE 1

|  | R |  | d |  | nd |  | vd |
|---|---|---|---|---|---|---|---|
| S1 | ∞ | d0= | −0.806 |  |  |  |  |
| R1 | 1.954 | d1= | 0.901 | nd1 | 1.4959 | v1 | 81.65 |
| R2 | 6.502 | d2= | 0.198 |  |  |  |  |
| R3 | 39.715 | d3= | 0.250 | nd2 | 1.6700 | v2 | 19.39 |
| R4 | 11.877 | d4= | 0.386 |  |  |  |  |
| R5 | 30.650 | d5= | 0.200 | nd3 | 2.1552 | v3 | 17.66 |
| R6 | 26.922 | d6= | 0.282 |  |  |  |  |
| R7 | −56.332 | d7= | 0.340 | nd4 | 1.4959 | v4 | 81.65 |
| R8 | 88.254 | d8= | 0.388 |  |  |  |  |
| R9 | 7.908 | d9= | 0.399 | nd5 | 1.5584 | v5 | 54.16 |
| R10 | 12.302 | d10= | 0.324 |  |  |  |  |
| R11 | 1.843 | d11= | 0.313 | nd6 | 1.5168 | v6 | 64.17 |
| R12 | 3.135 | d12= | 1.016 |  |  |  |  |
| R13 | −2.051 | d13= | 0.370 | nd7 | 1.5168 | v7 | 64.17 |
| R14 | −186.366 | d14= | 0.300 |  |  |  |  |
| R15 | ∞ | d15= | 0.210 | ndg | 1.5168 | vg | 64.17 |
| R16 | ∞ | d16= | 0.262 |  |  |  |  |

Herein, meanings of various symbols will be described as follows.

S1: aperture.

R: a central curvature radius of an optical surface;

R1: a central curvature radius of the object side surface of the first lens L1;

R2: a central curvature radius of the image side surface of the first lens L1;

R3: a central curvature radius of the object side surface of the second lens L2;

R4: a central curvature radius of the image side surface of the second lens L2;

R5: a central curvature radius of the object side surface of the third lens L3;

R6: a central curvature radius of the image side surface of the third lens L3;

R7: a central curvature radius of the object side surface of the fourth lens L4;

R8: a central curvature radius of the image side surface of the fourth lens L4;

R9: a central curvature radius of the object side surface of the fifth lens L5;

R10: a central curvature radius of the image side surface of the fifth lens L5;

R11: a central curvature radius of the object side surface of the sixth lens L6;

R12: a central curvature radius of the image side surface of the sixth lens L6;

R13: a central curvature radius of the object side surface of the seventh lens L7

R14: a central curvature radius of the image side surface of the seventh lens L7

R15: a central curvature radius of the object side surface of the optical filter GF;

R16: a central curvature radius of the image side surface of the optical filter GF;

d: an on-axis thickness of a lens, an on-axis distance between lenses;

d0: an on-axis distance from the aperture S1 to the object side surface of the first lens L1;

d1: an on-axis thickness of the first lens L1;

d2: an on-axis distance from the image side surface of the first lens L1 to the object side surface of the second lens L2;

d3: an on-axis thickness of the second lens L2;

d4: an on-axis distance from the image side surface of the second lens L2 to the object side surface of the third lens L3;

d5: an on-axis thickness of the third lens L3;

d6: an on-axis distance from the image side surface of the third lens L3 to the object side surface of the fourth lens L4;

d7: an on-axis thickness of the fourth lens L4;

d8: an on-axis distance from the image side surface of the fourth lens L4 to the object side surface of the fifth lens L5;

d9: an on-axis thickness of the fifth lens L5;

d10: an on-axis distance from the image side surface of the fifth lens L5 to the object side surface of the sixth lens L6;

d11: an on-axis thickness of the sixth lens L6;

d12: an on-axis distance from the image side surface of the sixth lens L6 to the object side surface of the seventh lens L7;

d13: an on-axis thickness of the seventh lens L7;

d14: an on-axis distance from the image side surface of the seventh lens L7 to the object side surface of the optical filter GF;

d15: an on-axis thickness of the optical filter GF;

d16: on-axis distance from the image side surface of the optical filter GF to the image surface Si;

nd: refractive index of a d line;

nd1: refractive index of a d line of the first lens L1;

nd2: refractive index of a d line of the second lens L2;

nd3: refractive index of a d line of the third lens L3;

nd4: refractive index of a d line of the fourth lens L4;

nd5: refractive index of a d line of the fifth lens L5;

nd6: refractive index of a d line of the sixth lens L6;

nd7: refractive index of a d line of the seventh lens L7;

ndg: refractive index of a d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

vg: abbe number of the optical filter GF.

Table 2 shows aspherical surface data of each lens of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | −1.0284E+00 | 1.6304E−02 | 5.5506E−03 | −7.3134E−03 | 1.4222E−02 | −1.6473E−02 |
| R2 | −6.1590E+01 | 2.5316E−02 | −4.1815E−02 | 9.0272E−02 | −1.4693E−01 | 1.5155E−01 |
| R3 | 8.9986E+01 | 6.2715E−03 | 4.7858E−04 | 1.8724E−02 | −1.9978E−02 | 9.7308E−03 |
| R4 | 7.1942E+01 | 1.4775E−02 | −8.4898E−03 | 4.4196E−02 | −5.8506E−02 | 5.6291E−02 |
| R5 | −3.0000E+02 | −4.4778E−02 | 2.3271E−02 | −1.2853E−01 | 3.1400E−01 | −4.5558E−01 |
| R6 | −6.9034E+02 | −4.1448E−02 | 1.5105E−02 | −6.3376E−02 | 1.1531E−01 | −1.2219E−01 |
| R7 | −1.2000E+03 | −5.6569E−02 | 5.5875E−02 | −1.5925E−01 | 2.5519E−01 | −2.4516E−01 |
| R8 | −3.9950E+02 | −6.1878E−02 | 5.1837E−02 | −1.1500E−01 | 1.4324E−01 | −1.0603E−01 |
| R9 | −3.5609E+00 | −4.3182E−02 | 2.3792E−02 | −1.1395E−02 | −2.0909E−01 | 3.8982E−03 |
| R10 | 4.6302E+00 | −1.1720E−01 | 8.1799E−02 | −4.4086E−02 | 1.6644E−02 | −4.8942E−03 |
| R11 | −1.8848E+00 | −3.6585E−02 | −8.6310E−03 | −2.2016E−03 | 8.4531E−04 | 1.2975E−04 |
| R12 | −5.5634E+00 | 6.9052E−02 | −6.8781E−02 | 2.3397E−02 | −4.9168E−03 | 7.3130E−04 |
| R13 | −3.0746E+00 | −4.1396E−02 | 1.9396E−02 | −4.4949E−03 | 7.7235E−04 | −1.0015E−04 |
| R14 | −2.7493E+02 | −3.4593E−02 | 1.5122E−02 | −5.1750E−03 | 1.1378E−03 | −1.5928E−04 |

| | Conic coefficient | Aspheric surface coefficients | | | |
|---|---|---|---|---|---|
| | k | A14 | A16 | A18 | A20 |
| R1 | −1.0284E+00 | 1.1521E−02 | −4.7300E−03 | 1.0532E−03 | −1.0071E−04 |
| R2 | −6.1590E+01 | −9.6921E−02 | 3.7207E−02 | −7.8420E−03 | 6.9524E−04 |

TABLE 2-continued

| | | | | | |
|---|---|---|---|---|---|
| R3 | 8.9986E+01 | 2.1873E−04 | −2.2676E−03 | 9.4726E−04 | −1.2464E−04 |
| R4 | 7.1942E+01 | −4.4712E−02 | 2.8558E−02 | −1.1431E−02 | 2.0687E−03 |
| R5 | −3.0000E+02 | 4.0165E−01 | −2.1186E−01 | 6.1942E−02 | −7.7326E−03 |
| R6 | −6.9034E+02 | 7.6070E−02 | −2.6002E−02 | 4.2700E−03 | −2.0960E−04 |
| R7 | −1.2000E+03 | 1.4231E−01 | −4.7945E−02 | 8.5971E−03 | −6.3509E−04 |
| R8 | −3.9950E+02 | 4.7294E−02 | −1.2260E−02 | 1.6945E−03 | −9.6612E−05 |
| R9 | −3.5609E+00 | −1.7790E−03 | 4.1306E−04 | −4.8134E−05 | 2.2153E−06 |
| R10 | 4.6302E+00 | 1.0720E−03 | −1.5059E−04 | 1.1513E−05 | −3.5659E−07 |
| R11 | −1.8848E+00 | −6.6499E−05 | 8.8824E−06 | −5.2515E−07 | 1.1937E−08 |
| R12 | −5.5634E+00 | −7.7092E−05 | 5.3510E−06 | −2.1442E−07 | 3.7094E−09 |
| R13 | −3.0746E+00 | 8.9856E−06 | −5.0967E−07 | 1.6248E−08 | −2.2072E−10 |
| R14 | −2.7493E+02 | 1.4087E−05 | −7.5815E−07 | 2.2584E−08 | −2.8488E−10 |

For convenience, an aspheric surface of each lens surface uses the aspheric surfaces shown in the above condition (1). However, the present disclosure is not limited to the aspherical polynomials form shown in the condition (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16}+A18r^{18}+A20r^{20} \quad (1)$$

Herein, k is a conic coefficient, A4, A6, A8, A10, A12, A14, A16, A18 and A20 are aspherical surface coefficients, c is a curvature of the optical surface, r is a vertical distance between a point on an aspherical curve and the optic axis, and z is an aspherical depth (a vertical distance between a point on an aspherical surface, having a distance of r from the optic axis, and a surface tangent to a vertex of the aspherical surface on the optic axis).

Table 3 and Table 4 show design data of inflexion points and arrest points of each of the lenses of the camera optical lens 10 according to the first embodiment of the present disclosure. P1R1 and P1R2 respectively denote the object side surface and the image side surface of the first lens L1, P2R1 and P2R2 respectively denote the object side surface and the image side surface of the second lens L2, P3R1 and P3R2 respectively denote the object side surface and the image side surface of the third lens L3, P4R1 and P4R2 respectively denote the object side surface and the image side surface of the fourth lens L4, P5R1 and P5R2 respectively denote the object side surface and the image side surface of the fifth lens L5, P6R1 and P6R2 respectively denote the object side surface and the image side surface of the sixth lens L6, and P7R1 and P7R2 respectively denote the object side surface and the image side surface of the seventh lens L7. The data in the column named "inflexion point position" refer to vertical distances from inflexion points arranged on each lens surface to an optic axis of the camera optical lens 10. The data in the column named "arrest point position" refer to vertical distances from arrest points arranged on each lens surface to the optical axis of the camera optical lens 10.

TABLE 3

| | Number of inflexion points | Inflexion point position 1 | Inflexion point position 2 | Inflexion point position 3 | Inflexion point position 4 |
|---|---|---|---|---|---|
| P1R1 | 1 | 1.525 | / | / | / |
| P1R2 | 1 | 1.205 | / | / | / |
| P2R1 | 0 | / | / | / | / |
| P2R2 | 0 | / | / | / | / |
| P3R1 | 1 | 0.255 | / | / | / |
| P3R2 | 2 | 0.275 | 1.255 | / | / |
| P4R1 | 2 | 1.285 | 1.585 | / | / |
| P4R2 | 3 | 0.135 | 1.455 | 1.785 | / |
| P5R1 | 2 | 0.605 | 1.955 | / | / |
| P5R2 | 4 | 0.255 | 1.975 | 2.195 | 2.385 |

TABLE 3-continued

| | Number of inflexion points | Inflexion point position 1 | Inflexion point position 2 | Inflexion point position 3 | Inflexion point position 4 |
|---|---|---|---|---|---|
| P6R1 | 4 | 0.825 | 2.115 | 2.995 | 3.095 |
| P6R2 | 4 | 0.935 | 3.075 | 3.225 | 3.375 |
| P7R1 | 3 | 1.505 | 3.205 | 3.655 | / |
| P7R2 | 3 | 3.165 | 3.395 | 3.755 | / |

TABLE 4

| | Number of arrest points | Arrest point position 1 |
|---|---|---|
| P1R1 | 0 | / |
| P1R2 | 1 | 1.545 |
| P2R1 | 0 | / |
| P2R2 | 0 | / |
| P3R1 | 1 | 0.425 |
| P3R2 | 1 | 0.455 |
| P4R1 | 0 | / |
| P4R2 | 1 | 0.215 |
| P5R1 | 1 | 1.035 |
| P5R2 | 1 | 0.465 |
| P6R1 | 1 | 1.355 |
| P6R2 | 1 | 1.525 |
| P7R1 | 0 | / |
| P7R2 | 0 | / |

Figure 2:
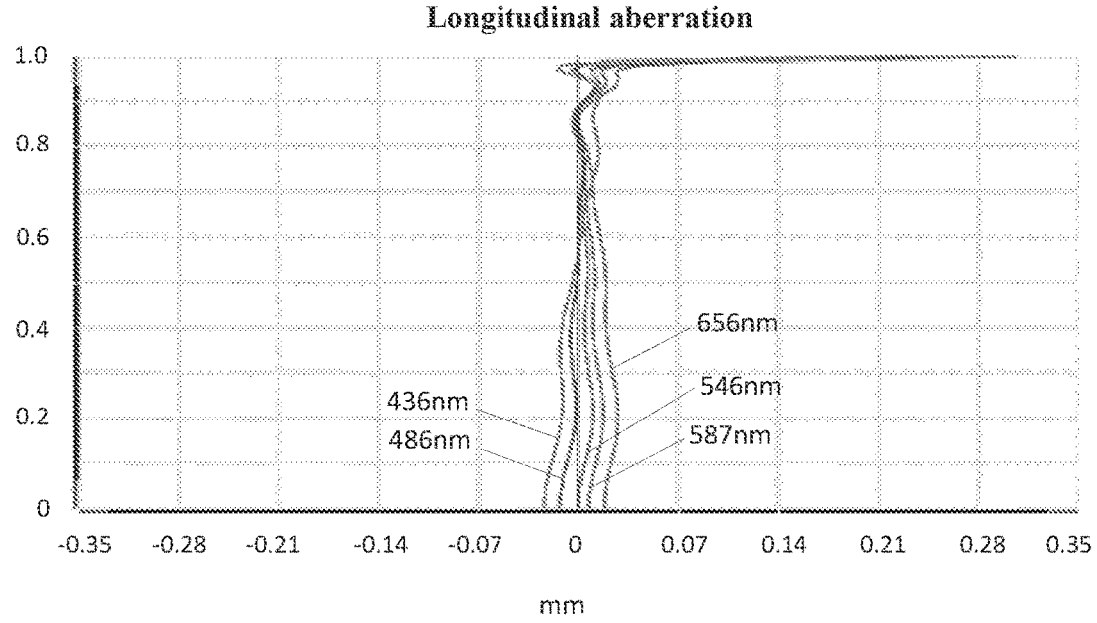
FIG. 2 is a schematic diagram of a longitudinal aberration of the camera optical lens shown in FIG. 1.
Figure 3:
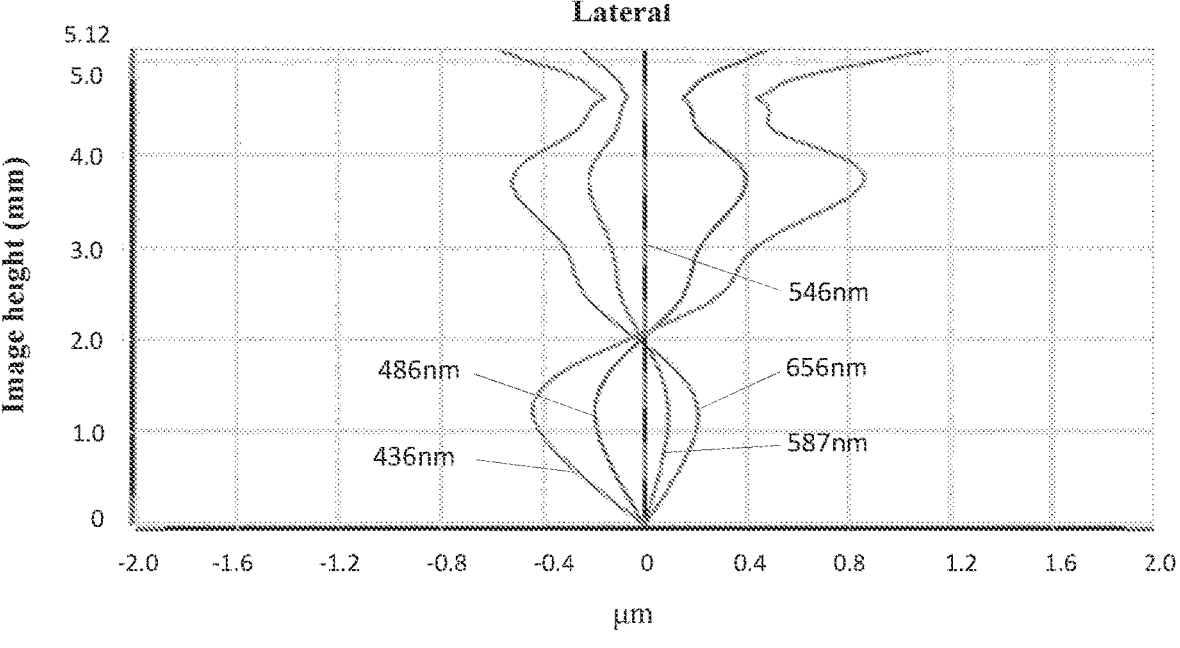
FIG. 3 is a schematic diagram of a lateral color of the camera optical lens shown in FIG. 1.
Figure 4:
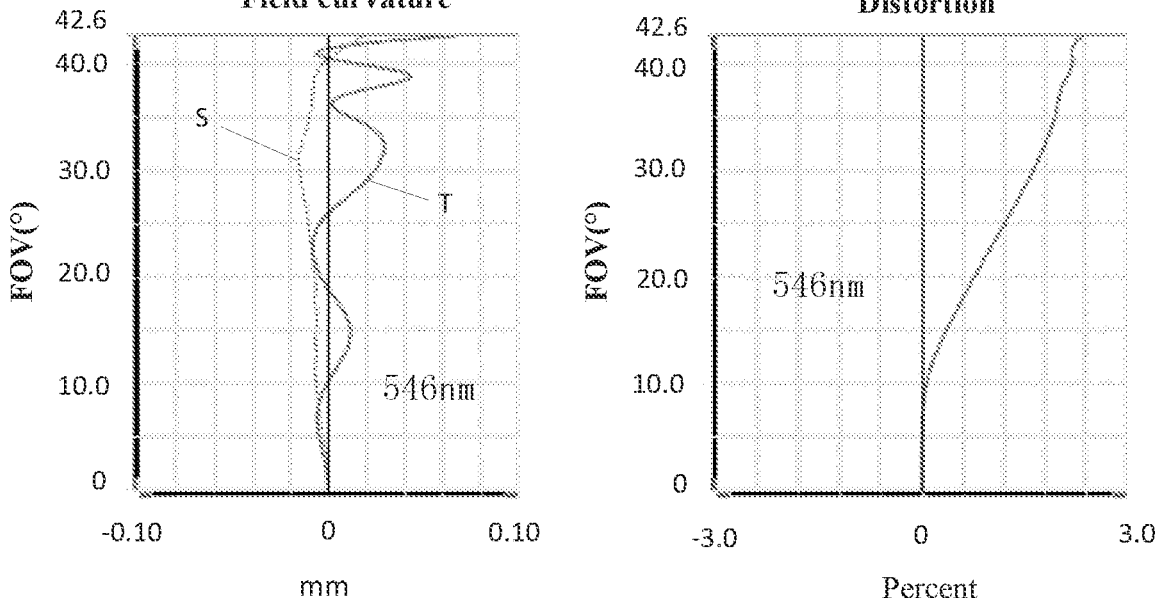
FIG. 4 is a schematic diagram of a field curvature and a distortion of the camera optical lens shown in FIG. 1.

FIG. 2 and FIG. 3 illustrate a longitudinal aberration and a lateral color with wavelengths of 656 nm, 587 nm, 546 nm, 486 nm, and 436 nm after passing the camera optical lens 10 according to Embodiment 1, respectively. FIG. 4 illustrates a field curvature and a distortion with a wavelength of 546 nm after passing the camera optical lens 10 according to Embodiment 1. A field curvature S in FIG. 4 is a field curvature in a sagittal direction, and T is a field curvature in a tangential direction.

Table 21 in the following shows various values of Embodiments 1, 2, 3, 4 and a comparative embodiment, and also values corresponding to parameters.

As shown in Table 21, Embodiment 1 satisfies the above conditions.

In the embodiment, an entrance pupil diameter (ENPD) of the camera optical lens 10 is 3.24 mm, an image height IH of 1.0H is 5.120 mm, an FOV is 85.20°. Thus, the camera optical lens 10 can meet the design requirements of a wide-angle and ultra-thin, and its on-axis and off-axis chromatic aberrations are fully corrected, thereby achieving excellent optical characteristics.

Embodiment 2

Figure 5:
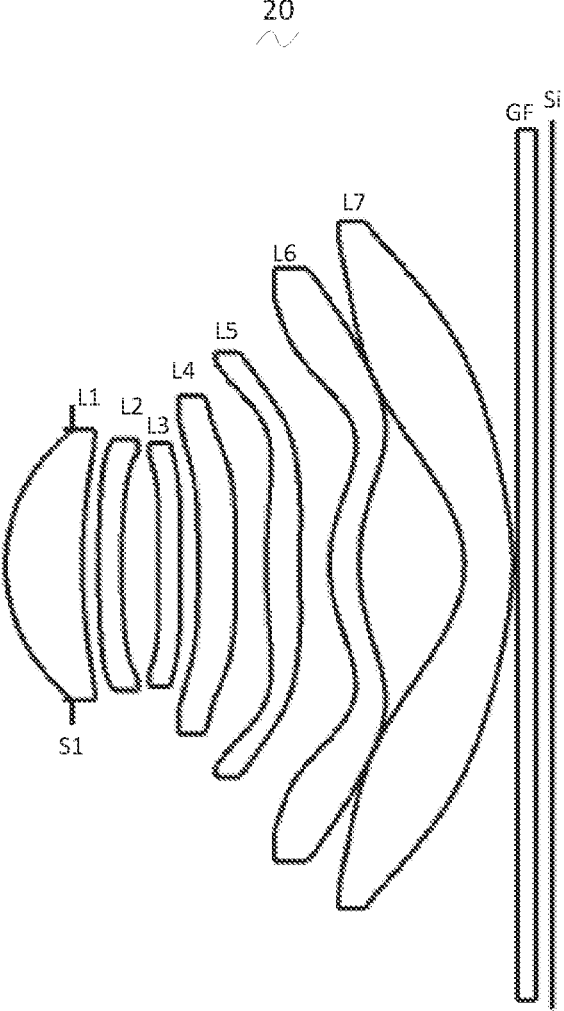
FIG. 5 is a schematic diagram of a structure of a camera optical lens according to Embodiment 2 of the present disclosure.

FIG. 5 is a schematic diagram of a structure of a camera optical lens 20 according to Embodiment 2 of the present disclosure. Embodiment 2 is basically the same as Embodiment 1 and involves symbols having the same meanings as Embodiment 1, and only differences therebetween will be described in the following.

Table 5 and Table 6 show design data of a camera optical lens 20 in Embodiment 2 of the present disclosure.

TABLE 5

| | R | d | | nd | | vd |
|---|---|---|---|---|---|---|
| S1 | ∞ | d0= | −0.743 | | | |
| R1 | 1.980 | d1= | 0.861 | nd1 | 1.4959 | v1 | 81.65 |
| R2 | 6.176 | d2= | 0.184 | | | |
| R3 | 15.855 | d3= | 0.257 | nd2 | 1.6700 | v2 | 19.39 |
| R4 | 10.112 | d4= | 0.419 | | | |
| R5 | 59.198 | d5= | 0.238 | nd3 | 2.1552 | v3 | 17.66 |
| R6 | 25.448 | d6= | 0.203 | | | |
| R7 | −98.826 | d7= | 0.421 | nd4 | 1.4959 | v4 | 81.65 |
| R8 | 388.344 | d8= | 0.344 | | | |
| R9 | 5.843 | d9= | 0.377 | nd5 | 1.5584 | v5 | 54.16 |
| R10 | 9.866 | d10= | 0.335 | | | |
| R11 | 1.709 | d11= | 0.337 | nd6 | 1.5168 | v6 | 64.17 |
| R12 | 2.657 | d12= | 1.181 | | | |
| R13 | −1.187 | d13= | 0.544 | nd7 | 1.5168 | v7 | 64.17 |
| R14 | −2.383 | d14= | 0.058 | | | |
| R15 | ∞ | d15= | 0.210 | ndg | 1.5168 | vg | 64.17 |
| R16 | ∞ | d16= | 0.172 | | | |

Table 6 shows aspherical surface data of each lens of the camera optical lens 20 in Embodiment 2 of the present disclosure.

TABLE 6

| | Conic coefficient | Aspheric surface coefficients | | | | |
|---|---|---|---|---|---|---|
| | k | A4 | A6 | A8 | A10 | A12 |
| R1 | −1.0441E+00 | 1.6594E−02 | 5.3290E−03 | −7.1074E−03 | 1.4151E−02 | −1.6505E−02 |
| R2 | −5.6971E+01 | 2.5731E−02 | −4.2631E−02 | 9.0435E−02 | −1.4674E−01 | 1.5157E−01 |
| R3 | −2.1201E+02 | 7.0741E−04 | 1.1928E−03 | 1.7959E−02 | −1.9628E−02 | 9.9703E−03 |
| R4 | 1.2738E+01 | 6.9242E−03 | −8.0797E−03 | 4.5716E−02 | −5.8324E−02 | 5.6060E−02 |
| R5 | −3.1896E+02 | −4.6523E−02 | 2.4857E−02 | −1.2823E−01 | 3.1424E−01 | −4.5560E−01 |
| R6 | −6.5792E+02 | −4.2246E−02 | 1.6879E−02 | −6.2869E−02 | 1.1523E−01 | −1.2237E−01 |
| R7 | 9.1174E+02 | −5.3315E−02 | 5.6325E−02 | −1.5933E−01 | 2.5530E−01 | −2.4512E−01 |
| R8 | −9.1192E+02 | −6.3456E−02 | 5.3623E−02 | −1.1487E−01 | 1.4323E−01 | −1.0604E−01 |
| R9 | −4.3950E+00 | −4.3233E−02 | 2.4167E−02 | −1.1386E−02 | −2.0943E−03 | 3.8971E−03 |
| R10 | 5.5483E+00 | −1.1250E−01 | 8.0522E−02 | −4.4093E−02 | 1.6648E−02 | −4.8936E−03 |
| R11 | −1.7718E+00 | −3.7573E−02 | −8.6898E−03 | −2.1987E−03 | 8.4570E−04 | 1.2978E−04 |
| R12 | −4.8487E+00 | 6.8001E−02 | −6.8821E−02 | 2.3401E−02 | −4.9157E−03 | 7.3133E−04 |
| R13 | −3.4411E+00 | −4.0734E−02 | 1.9325E−02 | −4.4985E−03 | 7.7238E−04 | −1.0014E−04 |
| R14 | −4.6465E+01 | −2.8268E−02 | 1.4700E−02 | −5.1796E−03 | 1.1380E−03 | −1.5927E−04 |

| | Conic coefficient | Aspheric surface coefficients | | | |
|---|---|---|---|---|---|
| | k | A14 | A16 | A18 | A20 |
| R1 | −1.0441E+00 | 1.1528E−02 | −4.7196E−03 | 1.0561E−03 | −1.0292E−04 |
| R2 | −5.6971E+01 | −9.6955E−02 | 3.7200E−02 | −7.8366E−03 | 6.9414E−04 |
| R3 | −2.1201E+02 | 1.7315E−04 | −2.3319E−03 | 9.3779E−04 | −1.1540E−04 |
| R4 | 1.2738E+01 | −4.4887E−02 | 2.8668E−02 | −1.1296E−02 | 1.9611E−03 |
| R5 | −3.1896E+02 | 4.0155E−01 | −2.1203E−01 | 6.1873E−02 | −7.6716E−03 |
| R6 | −6.5792E+02 | 7.5975E−02 | −2.6027E−02 | 4.2720E−03 | −2.0217E−04 |
| R7 | 9.1174E+02 | 1.4230E−01 | −4.7966E−02 | 8.5902E−03 | −6.3182E−04 |
| R8 | −9.1192E+00 | 4.7291E−02 | −1.2260E−02 | 1.6946E−03 | −9.6626E−05 |
| R9 | −4.3950E+00 | −1.7792E−03 | 4.1304E−04 | 4.8139E−05 | 2.2141E−06 |
| R10 | 5.5483E+00 | 1.0721E−03 | −1.5058E−04 | 1.1513E−05 | −3.5685E−07 |
| R11 | −1.7718E+00 | −6.6497E−05 | 8.8825E−06 | −5.2517E−07 | 1.1930E−08 |
| R12 | −4.8487E+00 | −7.7095E−05 | 5.3507E−06 | −2.1443E−07 | 3.7092E−09 |
| R13 | −3.4411E+00 | 8.9861E−06 | −5.0965E−07 | 1.6248E−08 | −2.2081E−10 |
| R14 | −4.6465E+01 | 1.4088E−05 | −7.5814E−07 | 2.2584E−08 | −2.8488E−10 |

Table 7 and table 8 show design data of inflexion points and arrest points of each lens of the camera optical lens 20 lens according to Embodiment 2 of the present disclosure.

TABLE 7

| | Number of inflexion points | Inflexion point position 1 | Inflexion point position 2 | Inflexion point position 3 | Inflexion point position 4 |
|---|---|---|---|---|---|
| P1R1 | 1 | 1.515 | / | / | / |
| P1R2 | 1 | 1.235 | / | / | / |
| P2R1 | 0 | / | / | / | / |
| P2R2 | 0 | / | / | / | / |
| P3R1 | 1 | 0.185 | / | / | / |
| P3R2 | 2 | 0.275 | 1.295 | / | / |
| P4R1 | 2 | 1.285 | 1.505 | / | / |
| P4R2 | 3 | 0.065 | 1.425 | 1.755 | / |
| P5R1 | 3 | 0.715 | 1.975 | 2.235 | / |
| P5R2 | 4 | 0.305 | 2.045 | 2.135 | 2.395 |
| P6R1 | 3 | 0.835 | 2.115 | 2.905 | / |
| P6R2 | 3 | 0.945 | 3.035 | 3.115 | / |
| P7R1 | 3 | 1.395 | 3.155 | 3.465 | / |
| P7R2 | 1 | 3.675 | / | / | / |

TABLE 8

|  | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 1 | 0.305 |
| P3R2 | 1 | 0.465 |
| P4R1 | 0 | / |
| P4R2 | 1 | 0.105 |
| P5R1 | 1 | 1.165 |
| P5R2 | 1 | 0.555 |
| P6R1 | 1 | 1.375 |
| P6R2 | 1 | 1.565 |
| P7R1 | 1 | 3.845 |
| P7R2 | 0 | / |

Figure 6:
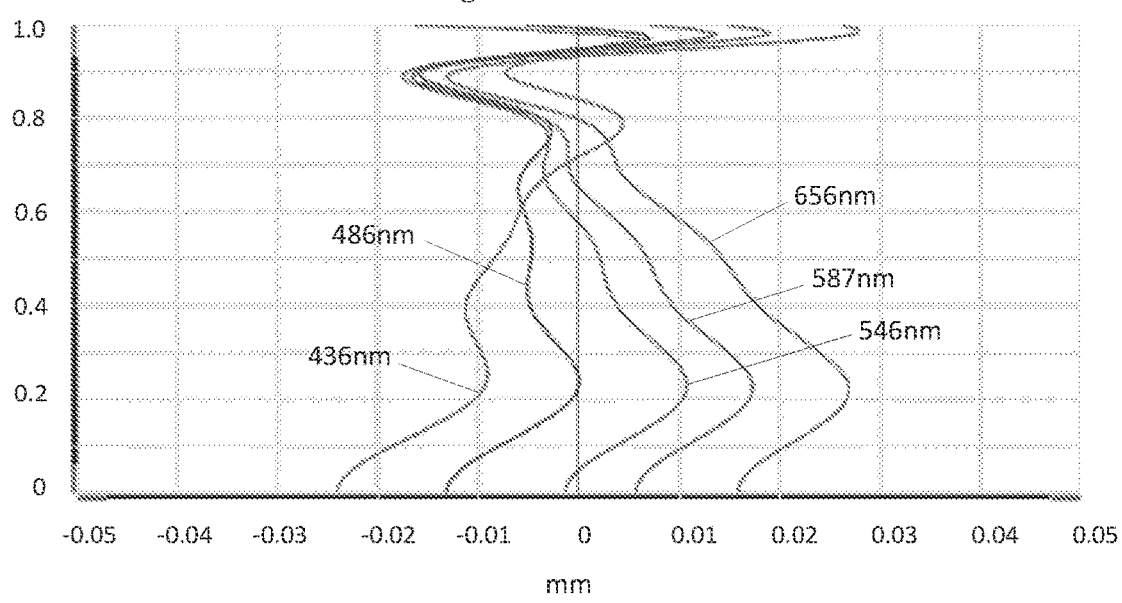
FIG. 6 is a schematic diagram of a longitudinal aberration of the camera optical lens shown in FIG. 5.
Figure 7:
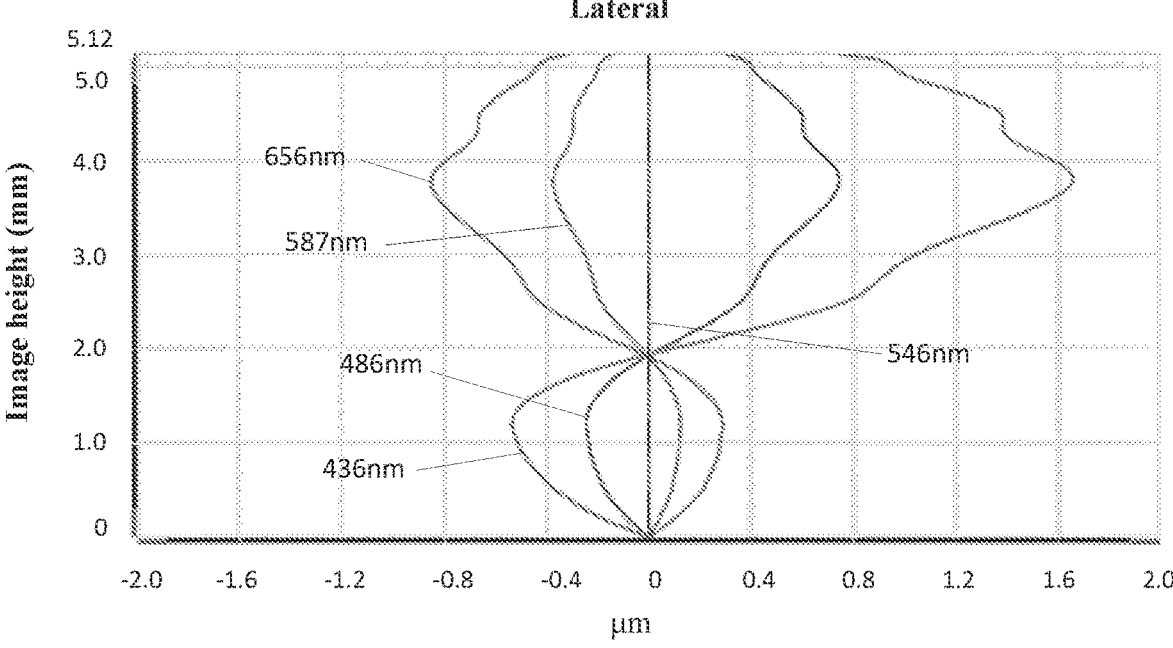
FIG. 7 is a schematic diagram of a lateral color of the camera optical lens shown in FIG. 5.
Figure 8:
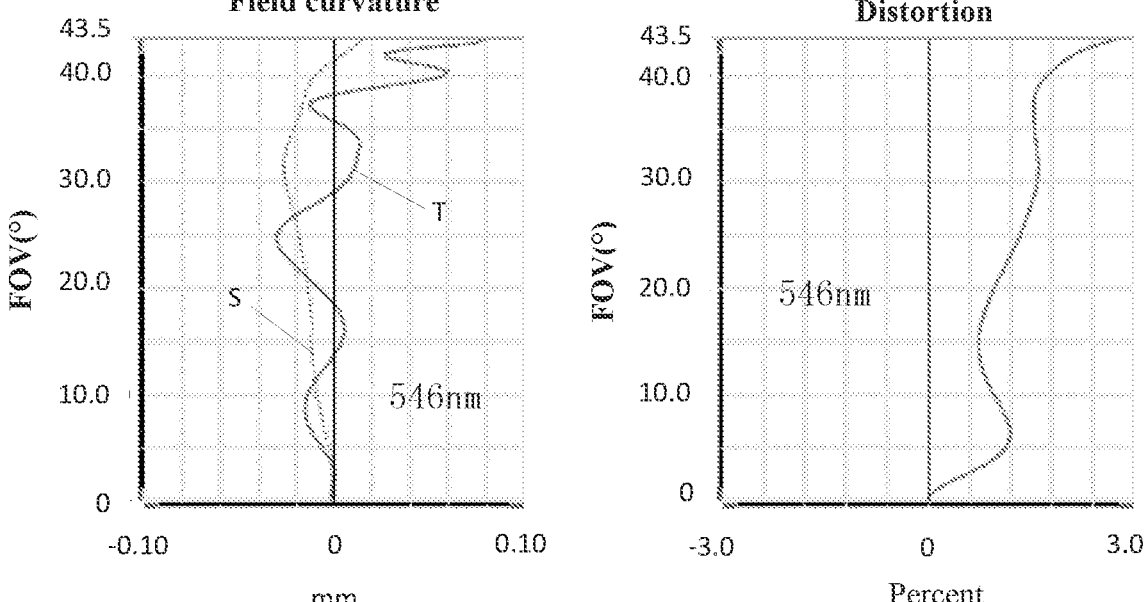
FIG. 8 is a schematic diagram of a field curvature and a distortion of the camera optical lens shown in FIG. 5.

FIG. 6 and FIG. 7 illustrate a longitudinal aberration and a lateral color with wavelengths of 656 nm, 587 nm, 546 nm, 486 nm, and 436 nm after passing the camera optical lens 20 according to Embodiment 2, respectively. FIG. 8 illustrates a field curvature and a distortion with a wavelength of 546 nm after passing the camera optical lens 20 according to Embodiment 2. A field curvature S in FIG. 8 is a field curvature in a sagittal direction, and T is a field curvature in a tangential direction.

As shown in Table 21, Embodiment 2 satisfies the above conditions.

In the embodiment, an entrance pupil diameter (ENPD) of the camera optical lens 20 is 3.127 mm, an image height IH of 1.0H is 5.120 mm, an FOV is 87.00°. Thus, the camera optical lens 20 can meet the design requirements of a wide-angle and ultra-thin, and its on-axis and off-axis chromatic aberrations are fully corrected, thereby achieving excellent optical characteristics.

Embodiment 3

Figure 9:
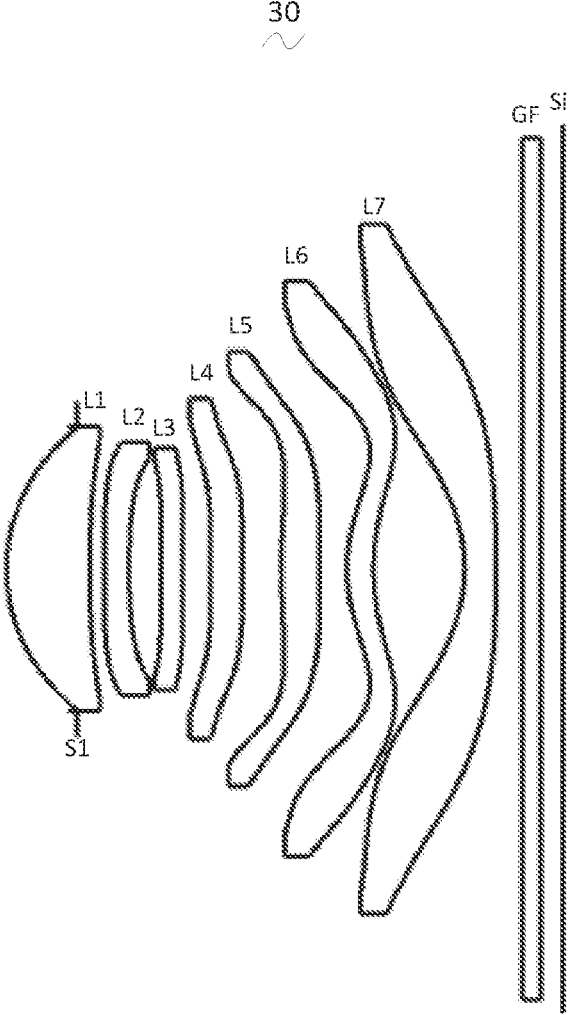
FIG. 9 is a schematic diagram of a structure of a camera optical lens according to Embodiment 3 of the present disclosure.

FIG. 9 is a schematic diagram of a structure of a camera optical lens 30 according to Embodiment 3 of the present disclosure. Embodiment 3 is basically the same as Embodiment 1 and involves symbols having the same meanings as Embodiment 1, and only differences therebetween will be described in the following.

Table 9 and Table 10 show design data of a camera optical lens 30 in Embodiment 3 of the present disclosure.

TABLE 9

|  | R | d |  | nd |  | vd |
|---|---|---|---|---|---|---|
| S1 | ∞ | d0= | −0.788 |  |  |  |
| RI | 2.010 | d1= | 0.929 | nd1 | 1.4959 | v1 | 81.65 |
| R2 | 10.132 | d2= | 0.167 |  |  |  |
| R3 | 48.514 | d3= | 0.280 | nd2 | 1.6700 | v2 | 19.39 |
| R4 | 7.843 | d4= | 0.353 |  |  |  |
| R5 | 17.005 | d5= | 0.249 | nd3 | 2.1552 | v3 | 17.66 |
| R6 | 15.907 | d6= | 0.318 |  |  |  |
| R7 | −425.462 | d7= | 0.358 | nd4 | 1.4959 | v4 | 81.65 |
| R8 | 4122.078 | d8= | 0.438 |  |  |  |
| R9 | 7.540 | d9= | 0.421 | nd5 | 1.5584 | v5 | 54.16 |
| R10 | 10.722 | d10= | 0.314 |  |  |  |
| R11 | 1.852 | d11= | 0.303 | nd6 | 1.5168 | v6 | 64.17 |
| R12 | 3.115 | d12= | 1.021 |  |  |  |
| R13 | −1.947 | d13= | 0.355 | nd7 | 1.5168 | v7 | 64.17 |
| R14 | −32.011 | d14= | 0.291 |  |  |  |
| R15 | ∞ | d15= | 0.210 | ndg | 1.5168 | vg | 64.17 |
| R16 | ∞ | d16= | 0.252 |  |  |  |

Table 10 shows aspherical surface data of each lens of the camera optical lens 30 in Embodiment 3 of the present disclosure.

TABLE 10

|  | Conic coefficient | Aspherical surface coefficients |  |  |  |  |
|---|---|---|---|---|---|---|
|  | k | A4 | A6 | A8 | A10 | A12 |
| R1 | −1.1859E+00 | 1.4397E−02 | 5.6515E−03 | −7.3930E−03 | 1.4135E−02 | −1.6509E−02 |
| R2 | −2.7415E+02 | 2.6766E−02 | −4.0205E−02 | 9.0750E−02 | −1.4689E−01 | 1.5148E−01 |
| R3 | 1.0608E+03 | 2.0278E−02 | −5.9841E−04 | 1.7455E−02 | −2.0121E−02 | 9.8175E−03 |
| R4 | 2.7620E+01 | 1.9356E−02 | −6.0873E−03 | 4.0731E−02 | −6.0133E−02 | 5.6243E−02 |
| R5 | −2.5012E+02 | −4.1801E−02 | 2.5087E−02 | −1.2835E−01 | 3.1437E−01 | −4.5535E−01 |
| R6 | −2.6083E+02 | −4.0525E−02 | 1.7001E−02 | −6.2650E−02 | 1.1545E−01 | −1.2222E−01 |
| R7 | −1.0005E+03 | −5.6469E−02 | 5.7001E−02 | −1.5974E−01 | 2.5512E−01 | −2.4514E−01 |
| R8 | −3.9761E+02 | −5.9486E−02 | 5.2673E−02 | −1.1515E−01 | 1.4320E−01 | −1.0603E−01 |
| R9 | −1.8595E+01 | −4.4310E−02 | 2.4271E−02 | −1.1310E−02 | −2.0896E−03 | 3.8963E−03 |
| R10 | −2.0054E+01 | −1.2036E−01 | 8.1748E−02 | −4.4043E−02 | 1.6651E−02 | −4.8934E−03 |
| R11 | −2.0164E+00 | −3.6615E−02 | −8.6359E−03 | −2.2019E−03 | 8.4544E−04 | 1.2977E−04 |
| R12 | −6.2913E+00 | 6.8327E−02 | −6.8760E−02 | 2.3396E−02 | −4.9171E−03 | 7.3128E−04 |
| R13 | −3.1807E+00 | −4.1931E−02 | 1.9442E−02 | −4.4930E−03 | 7.7234E−04 | −1.0016E−04 |
| R14 | −1.1128E+03 | −3.4028E−02 | 1.5113E−02 | −5.1745E−03 | 1.1378E−03 | −1.5928E−04 |

|  | Conic coefficient | Aspherical surface coefficients |  |  |  |
|---|---|---|---|---|---|
|  | k | A14 | A16 | A18 | A20 |
| R1 | −1.1859E+00 | 1.1517E−02 | −4.7282E−03 | 1.0554E−03 | −9.9392E−05 |
| R2 | −2.7415E+02 | −9.6949E−02 | 3.7213E−02 | −7.8335E−03 | 6.9291E−04 |
| R3 | 1.0608E+03 | 2.2382E−04 | −2.2599E−03 | 9.5745E−04 | −1.4081E−04 |
| R4 | 2.7620E+01 | −4.4235E−02 | 2.8955E−02 | −1.1345E−02 | 1.8498E−03 |
| R5 | −2.5012E+02 | 4.0160E−01 | −2.1197E−01 | 6.1889E−02 | −7.7068E−03 |
| R6 | −2.6083E+02 | 7.6010E−02 | −2.6041E−02 | 4.2549E−03 | −2.0170E−04 |
| R7 | −1.0005E+03 | 1.4232E−01 | −4.7950E−02 | 8.5942E−03 | −6.3431E−04 |
| R8 | −3.9761E+02 | 4.7295E−02 | −1.2259E−02 | 1.6946E−03 | −9.6635E−05 |
| R9 | −1.8595E+01 | −1.7793E−03 | 4.1303E−04 | −4.8133E−05 | 2.2164E−06 |
| R10 | −2.0054E+01 | 1.0721E−03 | −1.5059E−04 | 1.1511E−05 | −3.5705E−07 |

TABLE 10-continued

| | | | | | |
|---|---|---|---|---|---|
| R11 | −2.0164E+00 | −6.6496E−05 | 8.8826E−06 | −5.2516E−07 | 1.1932E−08 |
| R12 | −6.2913E+00 | −7.7093E−05 | 5.3510E−06 | −2.1441E−07 | 3.7114E−09 |
| R13 | −3.1807E+00 | 8.9853E−06 | −5.0968E−07 | 1.6248E−08 | −2.2065E−10 |
| R14 | −1.1128E+03 | 1.4087E−05 | −7.5815E−07 | 2.2584E−08 | −2.8492E−10 |

Table 11 and Table 12 show design data inflexion points and arrest points of the respective lenses in the camera optical lens 30 according to Embodiment 3 of the present disclosure.

TABLE 11

| | Number of inflexion points | Inflexion point position 1 | Inflexion point position 2 | Inflexion point position 3 | Inflexion point position 4 |
|---|---|---|---|---|---|
| P1R1 | 1 | 1.595 | / | / | / |
| P1R2 | 1 | 1.395 | / | / | / |
| P2R1 | 0 | / | / | / | / |
| P2R2 | 0 | / | / | / | / |
| P3R1 | 1 | 0.335 | / | / | / |
| P3R2 | 2 | 0.345 | 1.255 | / | / |
| P4R1 | 2 | 1.295 | 1.535 | / | / |
| P4R2 | 3 | 0.025 | 1.445 | 1.775 | / |
| P5R1 | 2 | 0.565 | 1.955 | / | / |
| P5R2 | 4 | 0.275 | 1.955 | 2.235 | 2.405 |
| P6R1 | 4 | 0.815 | 2.115 | 3.015 | 3.105 |
| P6R2 | 2 | 0.925 | 3.035 | / | / |
| P7R1 | 4 | 1.495 | 3.295 | 3.625 | 3.875 |
| P7R2 | 4 | 3.035 | 3.605 | 3.645 | 3.995 |

TABLE 12

| | Number of arrest points | Arrest point position 1 |
|---|---|---|
| P1R1 | 0 | / |
| P1R2 | 0 | / |
| P2R1 | 0 | / |
| P2R2 | 0 | /0 |
| P3R1 | 1 | 0.565 |
| P3R2 | 1 | 0.585 |
| P4R1 | 0 | / |
| P4R2 | 1 | 0.035 |
| P5R1 | 1 | 1.005 |
| P5R2 | 1 | 0.485 |
| P6R1 | 1 | 1.335 |
| P6R2 | 1 | 1.505 |
| P7R1 | 0 | / |
| P7R2 | 0 | / |

Figure 10:
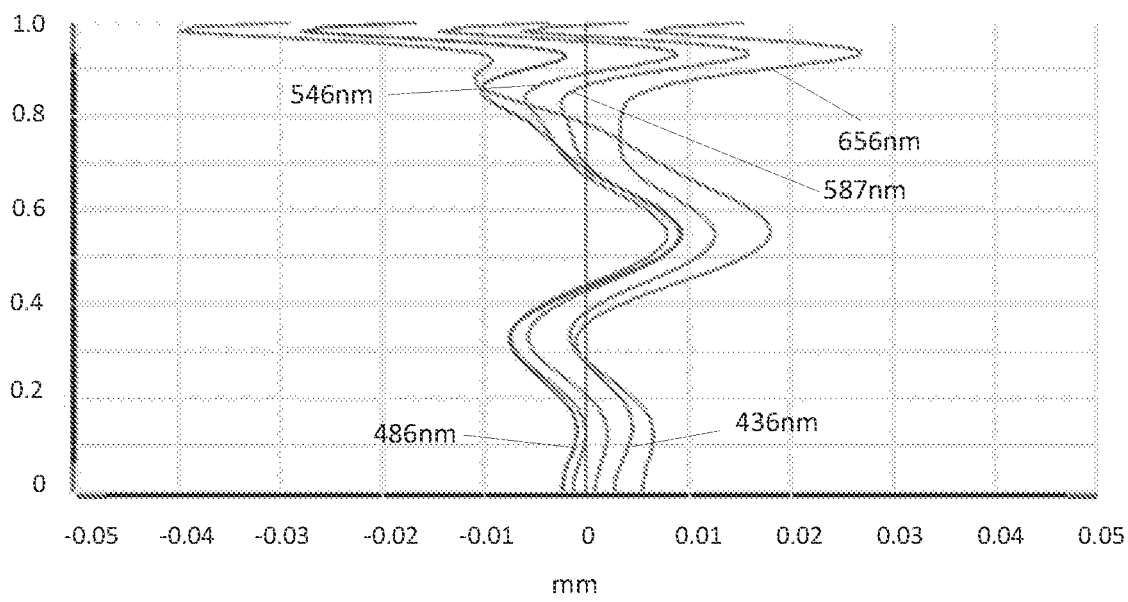
FIG. 10 is a schematic diagram of a longitudinal aberration of the camera optical lens shown in FIG. 9.
Figure 11:
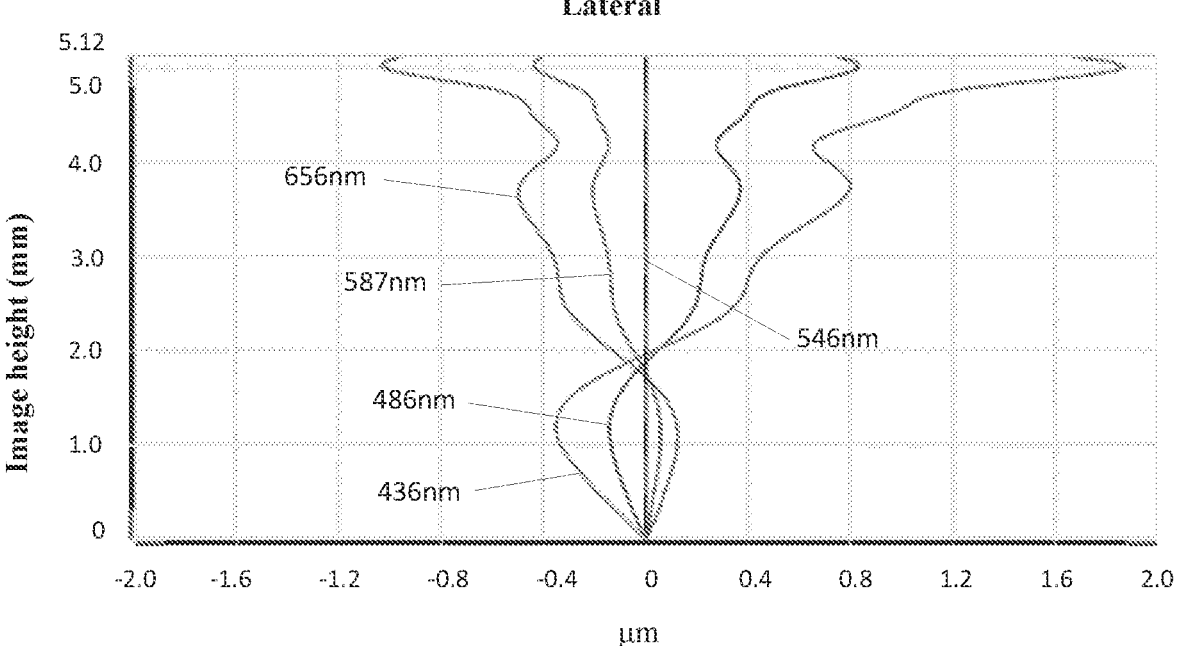
FIG. 11 is a schematic diagram of a lateral color of the camera optical lens shown in FIG. 9.
Figure 12:
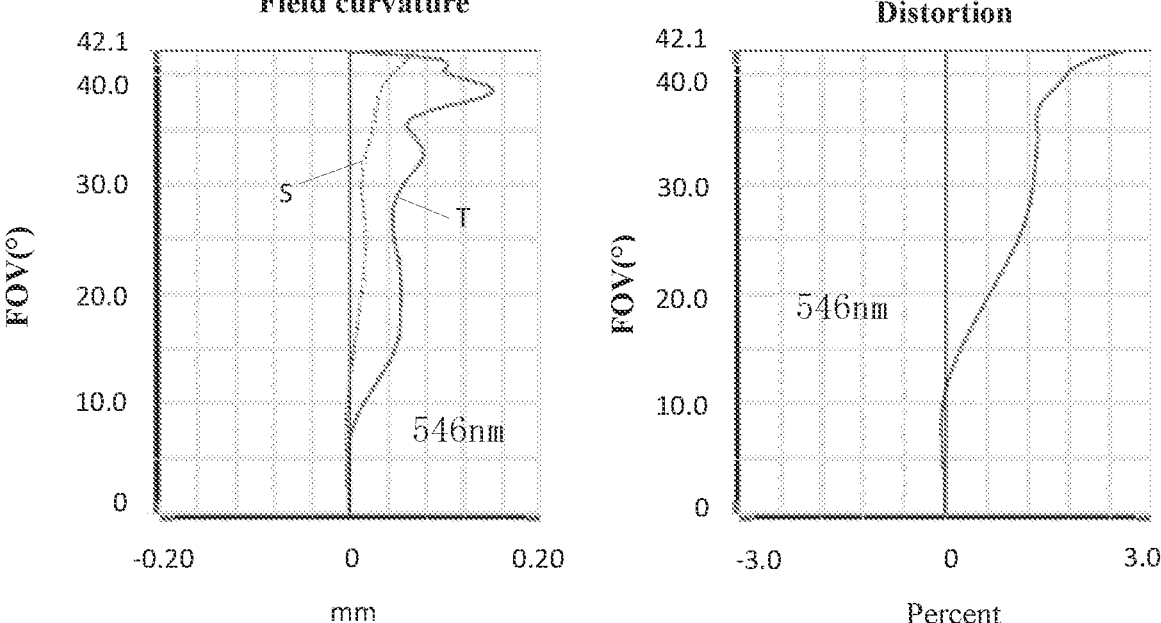
FIG. 12 is a schematic diagram of a field curvature and a distortion of the camera optical lens shown in FIG. 9.

FIG. 10 and FIG. 11 illustrate a longitudinal aberration and a lateral color with wavelengths of 656 nm, 587 nm, 546 nm, 486 nm, and 436 nm after passing the camera optical lens 30 according to Embodiment 3. FIG. 12 illustrates a field curvature and a distortion of light with a wavelength of 546 nm after passing the camera optical lens 30 according to Embodiment 3. A field curvature S in FIG. 12 is a field curvature in a sagittal direction, and T is a field curvature in a tangential direction.

As shown in Table 21, Embodiment 3 satisfies the above conditions.

In the embodiment, an entrance pupil diameter (ENPD) of the camera optical lens 30 is 3.283 mm, an image height IH of 1.0H is 5.120 mm, an FOV is 84.20°. The camera optical lens 30 can meet the design requirements of a wide-angle and ultra-thin, and its on-axis and off-axis chromatic aberrations are fully corrected, thereby achieving excellent optical characteristics.

Embodiment 4

Figure 13:
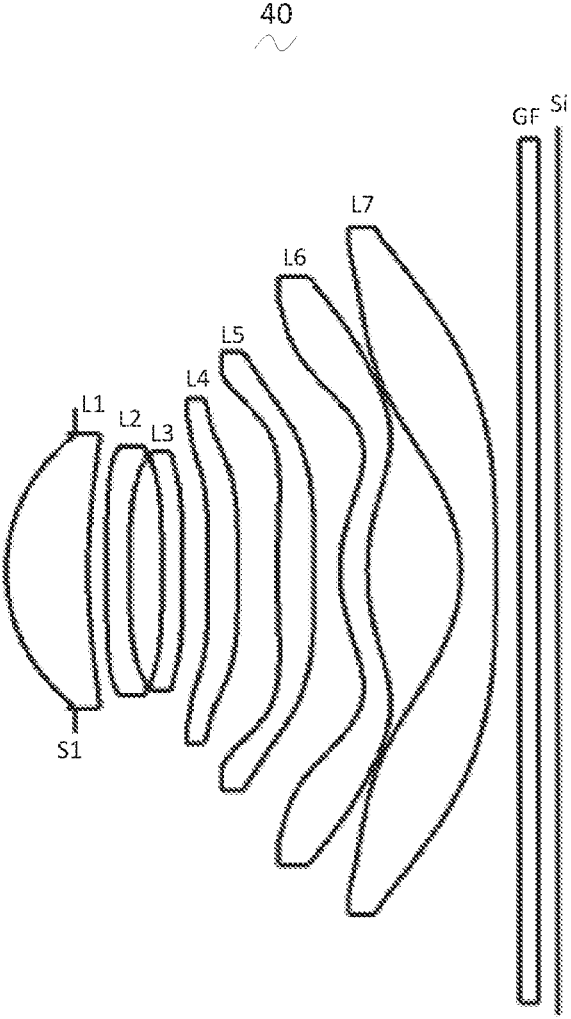
FIG. 13 is a schematic diagram of a structure of a camera optical lens according to Embodiment 4 of the present disclosure.

FIG. 13 is a schematic diagram of a structure of a camera optical lens 40 according to Embodiment 4 of the present disclosure. Embodiment 4 is basically the same as Embodiment 1 and involves symbols having the same meanings as Embodiment 1, and only differences therebetween will be described in the following.

In the embodiment, the object-side surface of the second lens L2 is concave in the paraxial region, the object-side surface of the third lens L3 is concave in the paraxial region, the image-side surface of the third lens L3 is convex in the paraxial region, the third lens L3 has a positive refractive power. The object-side surface of the fourth lens L4 is convex in the paraxial region, the image-side surface of the fourth lens L4 is convex in the paraxial region, the fourth lens L4 has a positive refractive power.

Table 13 and Table 14 show design data of a camera optical lens 40 in Embodiment 4 of the present disclosure.

TABLE 13

| | R | d | | nd | | vd | |
|---|---|---|---|---|---|---|---|
| S1 | ∞ | d0= | −0.762 | | | | |
| R1 | 1.986 | d1= | 0.907 | nd1 | 1.4959 | v1 | 81.65 |
| R2 | 7.420 | d2= | 0.209 | | | | |
| R3 | −1290.960 | d3= | 0.250 | nd2 | 1.6700 | v2 | 19.39 |
| R4 | 13.803 | d4= | 0.362 | | | | |
| R5 | −1081.893 | d5= | 0.227 | nd3 | 2.1552 | v3 | 17.66 |
| R6 | −871.192 | d6= | 0.285 | | | | |
| R7 | 307.047 | d7= | 0.328 | nd4 | 1.4959 | v4 | 81.65 |
| R8 | −83345.818 | d8= | 0.444 | | | | |
| R9 | 9.688 | d9= | 0.398 | nd5 | 1.5584 | v5 | 54.16 |
| R10 | 14.027 | d10= | 0.295 | | | | |
| R11 | 1.860 | d11= | 0.308 | nd6 | 1.5168 | v6 | 64.17 |
| R12 | 3.110 | d12= | 1.035 | | | | |
| R13 | −1.982 | d13= | 0.390 | nd7 | 1.5168 | v7 | 64.17 |
| R14 | −1709.105 | d14= | 0.257 | | | | |
| R15 | ∞ | d15= | 0.210 | ndg | 1.5168 | vg | 64.17 |
| R16 | ∞ | d16= | 0.223 | | | | |

Table 14 shows aspherical surface data of each lens of the camera optical lens 40 in Embodiment 4 of the present disclosure.

TABLE 14

| | Conic coefficient | Aspherical surface coefficients | | | | |
|---|---|---|---|---|---|---|
| | k | A4 | A6 | A8 | A10 | A12 |
| R1 | −1.0280E+00 | 1.5007E−02 | 5.1176E−03 | −6.9022E−03 | 1.4176E−02 | −1.6529E−02 |
| R2 | −6.9398E+01 | 1.8965E−02 | −3.4937E−02 | 8.8561E−02 | −1.4736E−01 | 1.5154E−01 |

TABLE 14-continued

| | | | | | |
|---|---|---|---|---|---|
| R3 | 4.3497E+01 | 1.8523E-02 | -3.2301E-03 | 1.8002E-02 | -2.0378E-02 | 9.6588E-03 |
| R4 | 6.1639E+01 | 2.1509E-02 | -8.9687E-04 | 3.7427E-02 | -5.9940E-02 | 5.7148E-02 |
| R5 | -1.1987E+02 | -4.6150E-02 | 2.8369E-02 | -1.3005E-01 | 3.1327E-01 | -4.5549E-01 |
| R6 | -4.2251E+02 | -4.3426E-02 | 1.6102E-02 | -6.2418E-02 | 1.1528E-01 | -1.2226E-01 |
| R7 | 2.1400E+02 | -6.2497E-02 | 5.8461E-02 | -1.5948E-01 | 2.5517E-01 | -2.4514E-01 |
| R8 | 1.0000E+03 | -6.0465E-02 | 5.1292E-02 | -1.1516E-01 | 1.4329E-01 | -1.0601E-01 |
| R9 | -2.9222E+00 | -4.3458E-02 | 2.3923E-02 | -1.1388E-02 | -2.0842E-03 | 3.8984E-03 |
| R10 | 1.9675E+00 | -1.1875E-01 | 8.1765E-02 | -4.4039E-02 | 1.6648E-02 | -4.8937E-03 |
| R11 | -1.9012E+02 | -3.6610E-02 | -8.6449E-03 | -2.1997E-02 | 8.4564E-04 | 1.2976E-04 |
| R12 | -5.3721E+00 | 6.8684E-02 | -6.8718E-02 | 2.3396E-02 | -4.9169E-03 | 7.3129E-04 |
| R13 | -2.9849E+00 | -4.0926E-02 | 1.9376E-02 | -4.4964E-03 | 7.7229E-04 | -1.0015E-04 |
| R14 | -9.8767E+02 | -3.3677E-02 | 1.5077E-02 | -5.1775E-03 | 1.1377E-03 | -1.5928E-04 |

| | Conic coefficient | Aspherical surface coefficients | | | |
|---|---|---|---|---|---|
| | k | A14 | A16 | A18 | A20 |
| R1 | -1.0280E+00 | 1.1517E-02 | -4.7266E-03 | 1.0541E-03 | -1.0020E-04 |
| R2 | -6.9398E+01 | -9.6924E-02 | 3.7233E-02 | -7.8190E-03 | 6.8635E-04 |
| R3 | 4.3497E+01 | 3.6751E-04 | -2.2154E-03 | 9.3586E-04 | -1.3425E-04 |
| R4 | 6.1639E+01 | -4.4421E-02 | 2.8803E-02 | -1.1340E-02 | 1.9149E-03 |
| R5 | -1.1987E+02 | 4.0185E-01 | -2.1181E-01 | 6.1925E-02 | -7.7508E-03 |
| R6 | -4.2251E+02 | 7.6013E-02 | -2.6012E-02 | 4.2732E-03 | -2.0642E-04 |
| R7 | 2.1400E+02 | 1.4232E-01 | -4.7950E-02 | 8.5949E-03 | -6.3407E-04 |
| R8 | 1.0000E+03 | 4.7297E-02 | -1.2261E-02 | 1.6942E-03 | -9.6578E-05 |
| R9 | -2.9222E+00 | -1.7792E-03 | 4.1303E-04 | -4.8139E-05 | 2.2164E-06 |
| R10 | 1.9675E+00 | 1.0721E-03 | -1.5059E-04 | 1.1511E-05 | -3.5715E-07 |
| R11 | -1.9012E+00 | -6.6500E-05 | 8.8822E-06 | -5.2516E-07 | 1.1936E-08 |
| R12 | -5.3721E+00 | -7.7093E-05 | 5.3510E-06 | -2.1442E-07 | 3.7097E-09 |
| R13 | -2.9849E+00 | 8.9857E-06 | -5.0966E-07 | 1.6248E-08 | -2.2066E-10 |
| R14 | -9.8767E+02 | 1.4087E-05 | -7.5814E-07 | 2.2585E-08 | -2.8483E-10 |

Table 15 and Table 16 show design data inflexion points and arrest points of the respective lenses in the camera optical lens 40 according to Embodiment 4 of the present disclosure.

TABLE 15

| | Number of inflexion points | Inflexion point position 1 | Inflexion point position 2 | Inflexion point position 3 | Inflexion point position 4 |
|---|---|---|---|---|---|
| P1R1 | 1 | 1.545 | / | / | / |
| P1R2 | 1 | 1.175 | / | / | / |
| P2R1 | 1 | 0.065 | / | / | / |
| P2R2 | 0 | / | / | / | / |
| P3R1 | 0 | / | / | / | / |
| P3R2 | 1 | 1.245 | / | / | / |
| P4R1 | 3 | 0.075 | 1.275 | 1.655 | / |
| P4R2 | 2 | 1.445 | 1.825 | / | / |
| P5R1 | 2 | 0.525 | 1.955 | / | / |
| P5R2 | 4 | 0.235 | 1.935 | 2.225 | 2.425 |
| P6R1 | 4 | 0.815 | 2.105 | 2.955 | 3.135 |
| P6R2 | 2 | 0.945 | 3.395 | / | / |
| P7R1 | 3 | 1.495 | 3.115 | 3.545 | / |
| P7R2 | 1 | 3.675 | / | / | / |

TABLE 16

| | Number of arrest points | Arrest point position 1 |
|---|---|---|
| P1R1 | 0 | / |
| P1R2 | 0 | / |
| P2R1 | 1 | 0.105 |
| P2R2 | 0 | / |
| P3R1 | 0 | / |
| P3R2 | 0 | / |
| P4R1 | 1 | 0.115 |
| P4R2 | 0 | / |
| P5R1 | 1 | 0.945 |

TABLE 16-continued

| | Number of arrest points | Arrest point position 1 |
|---|---|---|
| P5R2 | 1 | 0.425 |
| P6R1 | 1 | 1.345 |
| P6R2 | 1 | 1.535 |
| P7R1 | 1 | 3.865 |
| P7R2 | 0 | / |

Figure 14:
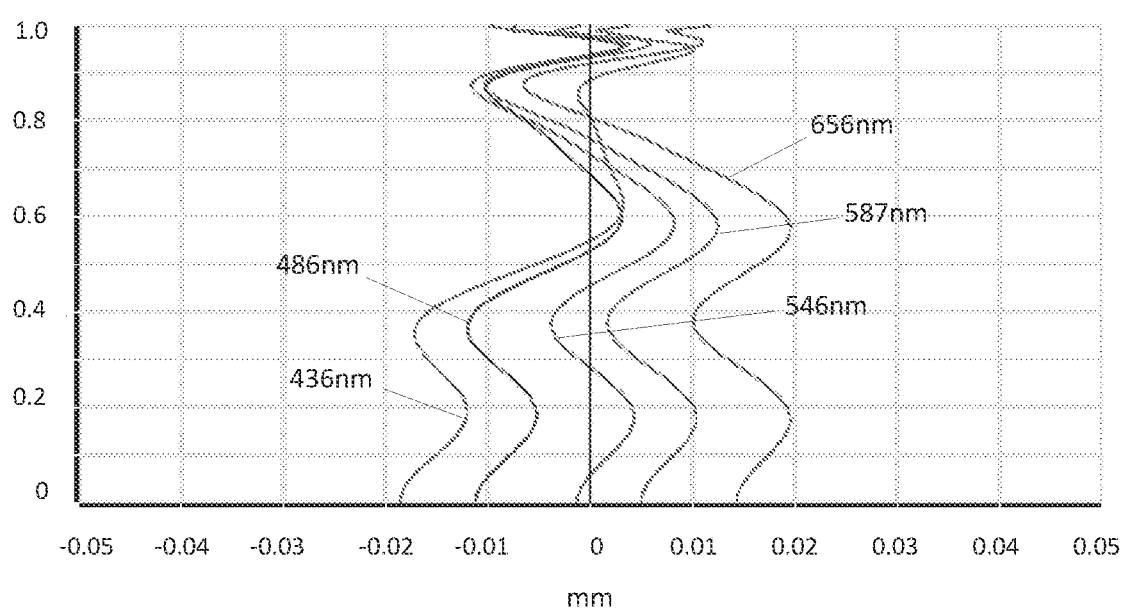
FIG. 14 is a schematic diagram of a longitudinal aberration of the camera optical lens shown in FIG. 13.
Figure 15:
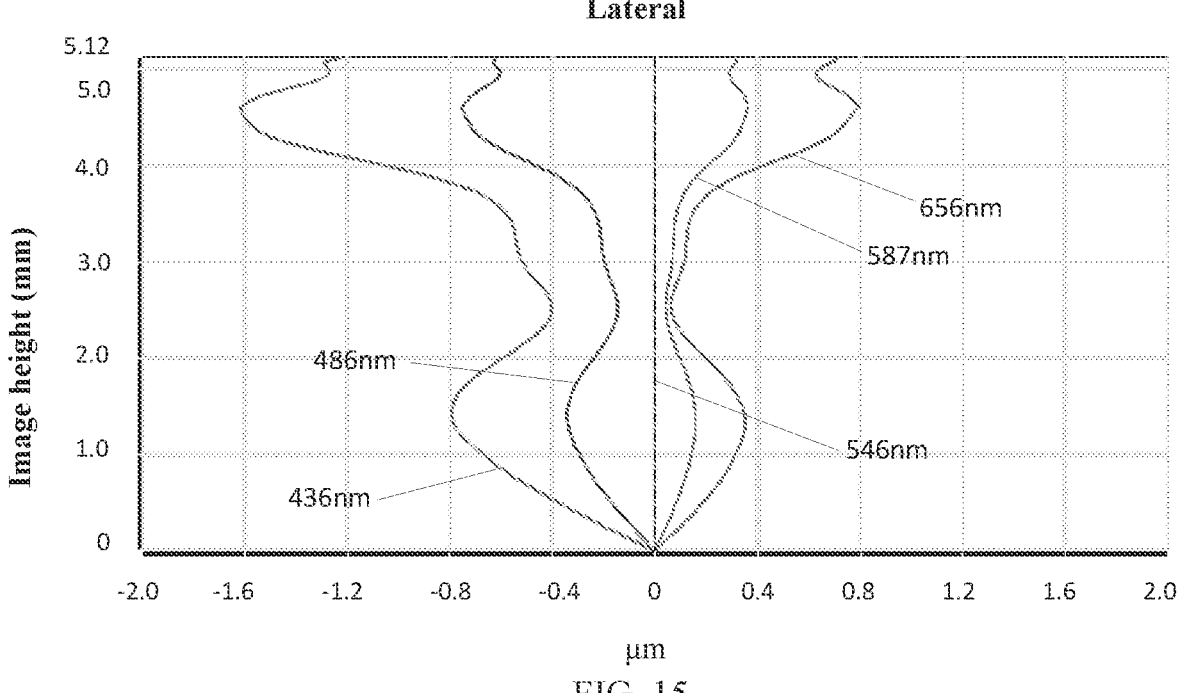
FIG. 15 is a schematic diagram of a lateral color of the camera optical lens shown in FIG. 13.
Figure 16:
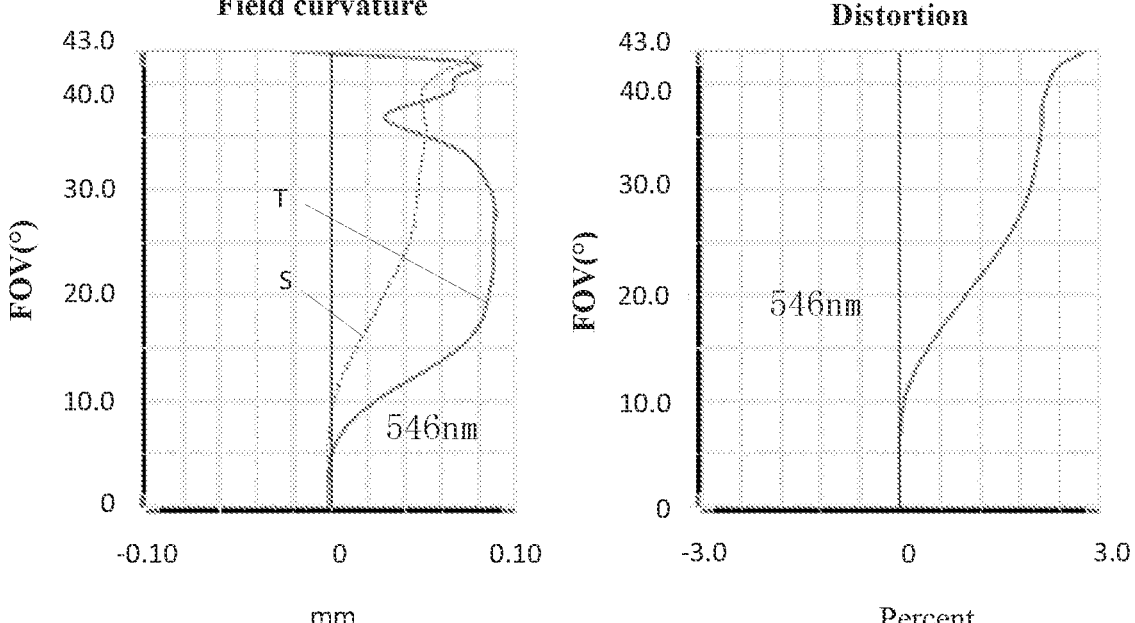
FIG. 16 is a schematic diagram of a field curvature and a distortion of the camera optical lens shown in FIG. 13.

FIG. 14 and FIG. 15 illustrate a longitudinal aberration and a lateral color with wavelengths of 656 nm, 587 nm, 546 nm, 486 nm, and 436 nm after passing the camera optical lens 40 according to Embodiment 4. FIG. 16 illustrates a field curvature and a distortion of light with a wavelength of 546 nm after passing the camera optical lens 40 according to Embodiment 4. A field curvature S in FIG. 16 is a field curvature in a sagittal direction, and T is a field curvature in a tangential direction.

Table 21 in the following shows various values of Embodiment 4, and also values corresponding to parameters which are specified in the above conditions. Obviously, the camera optical lens 40 satisfies above conditions.

In the embodiment, an entrance pupil diameter (ENPD) of the camera optical lens 40 is 3.182 mm, an image height IH of 1.0H is 5.120 mm, an FOV is 86.00°. The camera optical lens can 40 meet the design requirements of a wide-angle and ultra-thin, and its on-axis and off-axis chromatic aberrations are fully corrected, thereby achieving excellent optical characteristics.

Comparative Embodiment

The comparative embodiment is basically the same as the first embodiment, and the meaning of the symbols is the same as that according to the first embodiment. Only differences are listed below.

Figure 17:
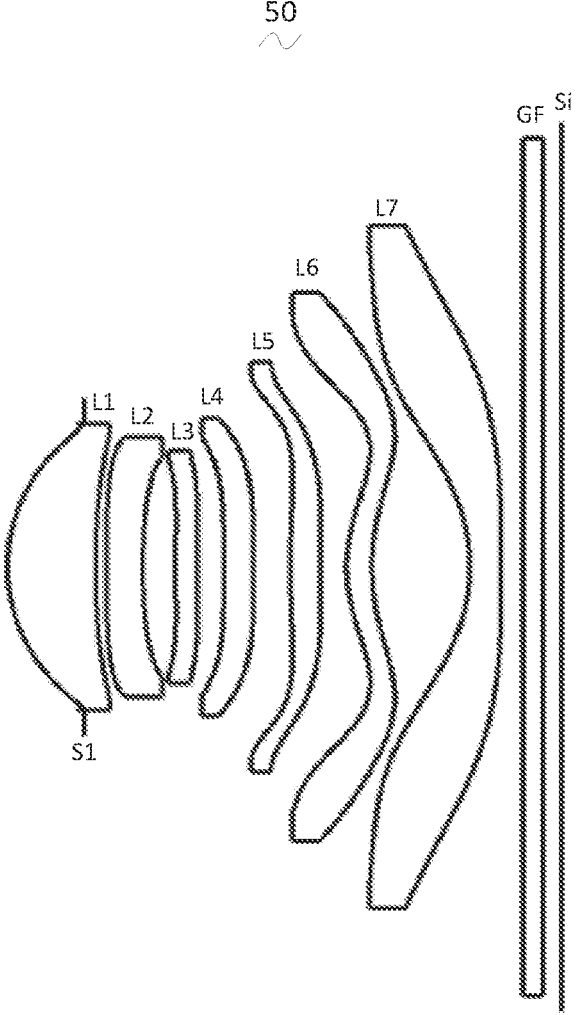
FIG. 17 is a schematic diagram of a structure of a camera optical lens according to a comparative embodiment of the present disclosure.

FIG. 17 shows a structure of the camera optical lens 50 according to the comparative embodiment of the present disclosure.

Table 17 and table 18 show design data of the camera optical lens 50 according to the comparative embodiment of the present disclosure.

Table 18 shows aspheric surface data of each of the lenses in the camera optical lens 50 according to the comparative embodiment of the present disclosure.

Table 19 and Table 20 show design data of inflexion points and arrest points of each of the lenses of the camera optical lens 50 according to the comparative embodiment of the present disclosure.

TABLE 17

|  | R | d |  | nd |  | vd |
|---|---|---|---|---|---|---|
| S1 | ∞ | d0= −0.860 |  |  |  |  |
| R1 | 1.950 | d1= 0.982 | nd1 | 1.4959 | v1 | 81.65 |
| R2 | 9.049 | d2= 0.118 |  |  |  |  |
| R3 | 49.411 | d3= 0.409 | nd2 | 1.6700 | v2 | 19.39 |
| R4 | 7.366 | d4= 0.364 |  |  |  |  |
| R5 | 17.637 | d5= 0.238 | nd3 | 2.1552 | v3 | 17.66 |
| R6 | 16.497 | d6= 0.300 |  |  |  |  |
| R7 | −321.588 | d7= 0.331 | nd4 | 1.4959 | v4 | 81.65 |
| R8 | 483.225 | d8= 0.411 |  |  |  |  |
| R9 | 7.829 | d9= 0.336 | nd5 | 1.5584 | v5 | 54.16 |
| R10 | 10.473 | d10= 0.293 |  |  |  |  |
| R11 | 1.839 | d11= 0.285 | nd6 | 1.5168 | v6 | 64.17 |
| R12 | 3.007 | d12= 1.091 |  |  |  |  |
| R13 | −2.129 | d13= 0.350 | nd7 | 1.5168 | v7 | 64.17 |
| R14 | −3205.812 | d14= 0.248 |  |  |  |  |
| R15 | ∞ | d15= 0.210 | ndg | 1.5168 | vg | 64.17 |
| R16 | ∞ | d16= 0.212 |  |  |  |  |

TABLE 18

|  | Conic coefficient | Aspherical surface coefficients |  |  |  |  |
|---|---|---|---|---|---|---|
|  | k | A4 | A6 | A8 | A10 | A12 |
| R1 | −1.0822E+00 | 1.1106E−02 | 1.3243E−02 | −1.2064E−02 | 1.4837E−02 | −1.6153E−02 |
| R2 | −3.0935E+02 | 4.1487E−02 | −4.5704E−02 | 8.8457E−02 | −1.4352E−01 | 1.5075E−01 |
| R3 | 1.0358E+03 | 3.2034E−02 | −2.4985E−02 | 3.2163E−02 | −2.3993E−02 | 9.0345E−03 |
| R4 | 3.0653E+01 | 1.9070E−03 | 1.3664E−02 | 6.1337E−03 | −4.1586E−02 | 6.2639E−02 |
| R5 | −4.9537E+02 | −4.4156E−02 | 3.0745E−02 | −1.3030E−01 | 3.0736E−01 | −4.5187E−01 |
| R6 | −3.9526E+02 | −3.2462E−02 | 1.4000E−02 | −6.7049E−02 | 1.1796E−01 | −1.2243E−01 |
| R7 | 8.7324E+02 | −6.0041E−02 | 6.5011E−02 | −1.6290E−01 | 2.5268E−01 | −2.4464E−01 |
| R8 | 7.3358E+02 | −6.4178E−02 | 6.0494E−02 | −1.1952E−01 | 1.4375E−01 | −1.0585E−01 |
| R9 | −1.7585E+01 | −4.6267E−02 | 2.5794E−02 | −1.1395E−01 | −2.0528E−03 | 3.9047E−03 |
| R10 | −1.3387E+01 | −1.2019E−01 | 8.1235E−02 | −4.3519E−02 | 1.6543E−02 | −4.8908E−03 |
| R11 | −2.0630E+00 | −3.5785E−02 | −8.6057E−03 | −2.2031E−03 | 8.4517E−04 | 1.2975E−04 |
| R12 | −6.1623E+00 | 6.8446E−02 | −6.8809E−02 | 2.3400E−02 | −4.9165E−03 | 7.3130E−04 |
| R13 | −3.0646E+00 | −4.0472E−02 | 1.8688E−02 | −4.3856E−03 | 7.6957E−04 | −1.0050E−04 |
| R14 | −8.0074E+02 | −3.3198E−02 | 1.4946E−02 | −5.1466E−03 | 1.1363E−03 | −1.5932E−04 |

|  | Conic coefficient | Aspherical surface coefficients |  |  |  |
|---|---|---|---|---|---|
|  | k | A14 | A16 | A18 | A20 |
| R1 | −1.0822E+00 | 1.1577E−02 | −4.7811E−03 | 1.0414E−03 | −9.4636E−05 |
| R2 | −3.0935E+02 | −9.7307E−02 | 3.7288E−02 | −7.7759E−03 | 6.7749E−04 |
| R3 | 1.0358E+03 | 7.2054E−04 | −2.2067E−03 | 9.1548E−04 | −1.3353E−04 |
| R4 | 3.0653E+01 | −5.2003E−02 | 2.5422E−02 | −6.4456E−03 | 6.1025E−04 |
| R5 | −4.9537E+02 | 4.0282E−01 | −2.1202E−01 | 6.0752E−02 | −7.2408E−03 |
| R6 | −3.9526E+02 | 7.5123E−02 | −2.5616E−02 | 4.3913E−03 | −2.6875E−04 |
| R7 | 8.7324E+02 | 1.4287E−01 | −4.8242E−02 | 8.5895E−03 | −6.1574E−04 |
| R8 | 7.3358E+02 | 4.7244E−02 | −1.2272E−02 | 1.6863E−03 | −9.3930E−05 |
| R9 | −1.7585E+01 | −1.7811E−03 | 4.1269E−04 | −4.8156E−05 | 2.2283E−06 |
| R10 | −1.3387E+01 | 1.0732E−03 | −1.5050E−04 | 1.1519E−05 | −3.6054E−07 |
| R11 | −2.0630E+00 | −6.6497E−05 | 8.8827E−06 | −5.2514E−07 | 1.1933E−08 |
| R12 | −6.1623E+00 | −7.7094E−05 | 5.3508E−06 | −2.1443E−07 | 3.7095E−09 |
| R13 | −3.0646E+00 | 8.9927E−06 | −5.0893E−07 | 1.6284E−08 | −2.2376E−10 |
| R14 | −8.0074E+02 | 1.4091E−05 | −7.5803E−07 | 2.2570E−08 | −2.8458E−10 |

TABLE 19

|  | Number of inflexion points | Inflexion point position 1 | Inflexion point position 2 | Inflexion point position 3 | Inflexion point position 4 |
|---|---|---|---|---|---|
| P1R1 | 1 | 1.575 | / | / | / |
| P1R2 | 1 | 1.415 | / | / | / |
| P2R1 | 0 | / | / | / | / |
| P2R2 | 0 | / | / | / | / |
| P3R1 | 2 | 0.315 | 1.225 | / | / |
| P3R2 | 2 | 0.355 | 1.235 | / | / |
| P4R1 | 0 | / | / | / | / |
| P4R2 | 1 | 0.055 | / | / | / |
| P5R1 | 2 | 0.545 | 1.925 | / | / |
| P5R2 | 2 | 0.275 | 1.885 | / | / |
| P6R1 | 2 | 0.815 | 2.105 | / | / |
| P6R2 | 1 | 0.925 | / | / | / |
| P7R1 | 4 | 1.535 | 3.345 | 3.495 | 3.735 |
| P7R2 | 4 | 3.035 | 3.495 | 3.715 | 4.005 |

TABLE 20

| | Number of arrest points | Arrest point position 1 |
|---|---|---|
| P1R1 | 0 | / |
| P1R2 | 0 | / |
| P2R1 | 0 | / |
| P2R2 | 0 | / |
| P3R1 | 1 | 0.535 |
| P3R2 | 1 | 0.605 |
| P4R1 | 0 | / |
| P4R2 | 1 | 0.095 |
| P5R1 | 1 | 0.995 |
| P5R2 | 1 | 0.495 |
| P6R1 | 1 | 1.345 |
| P6R2 | 1 | 1.515 |
| P7R1 | 0 | / |
| P7R2 | 0 | / |

Figure 18:
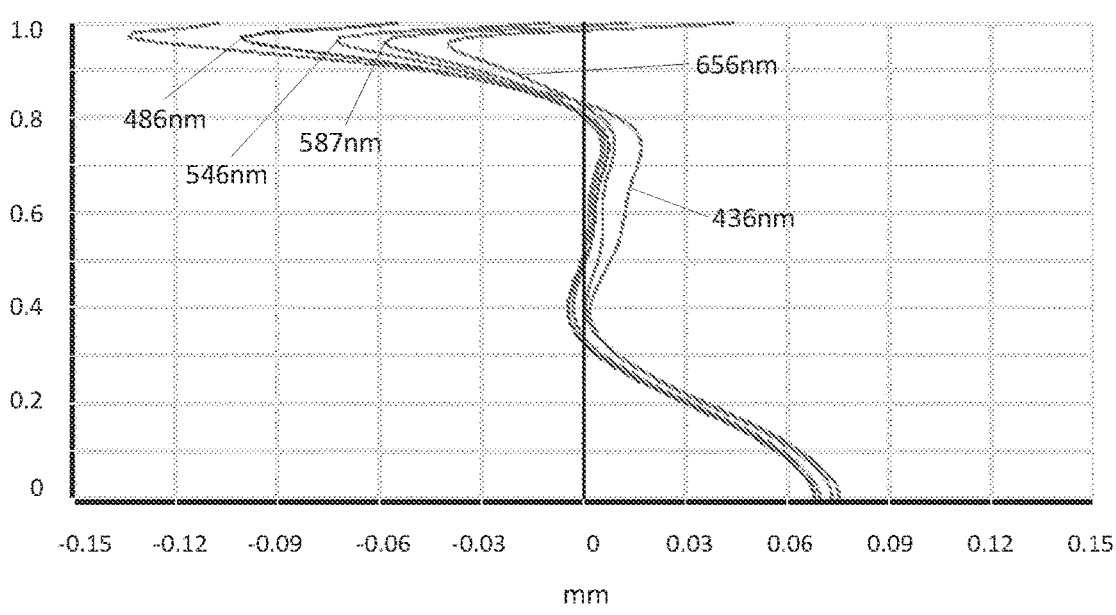
FIG. 18 is a schematic diagram of a longitudinal aberration of the camera optical lens shown in FIG. 17.
Figure 19:
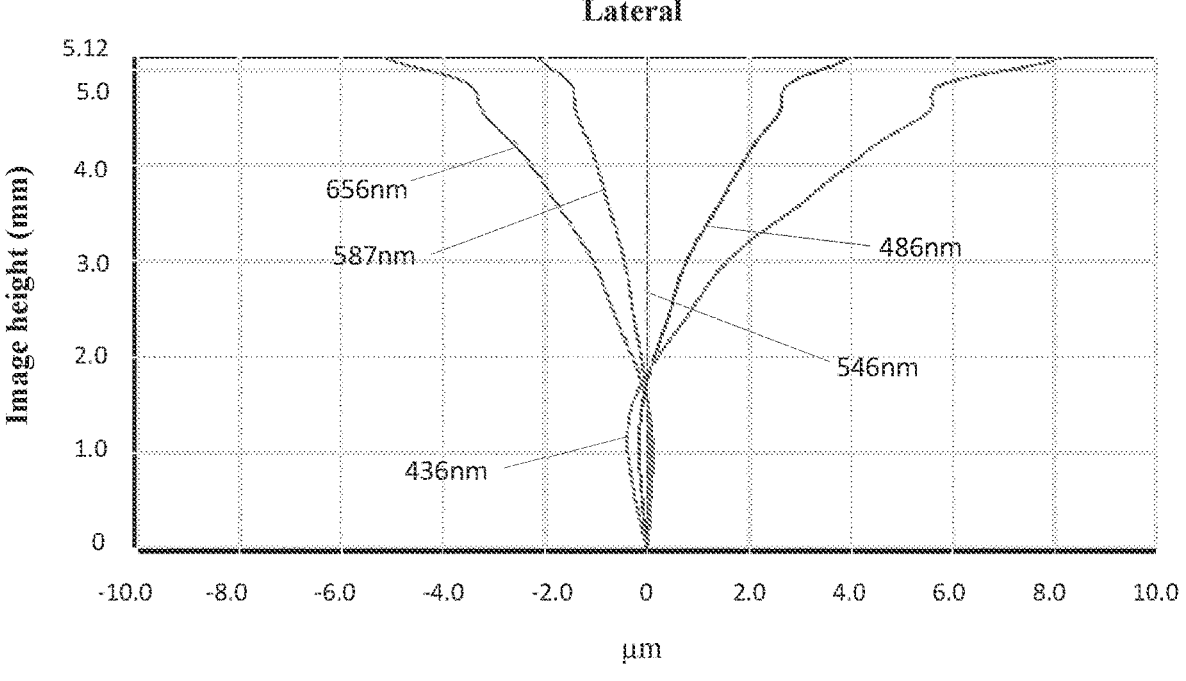
FIG. 19 is a schematic diagram of a lateral color of the camera optical lens shown in FIG. 17.
Figure 20:
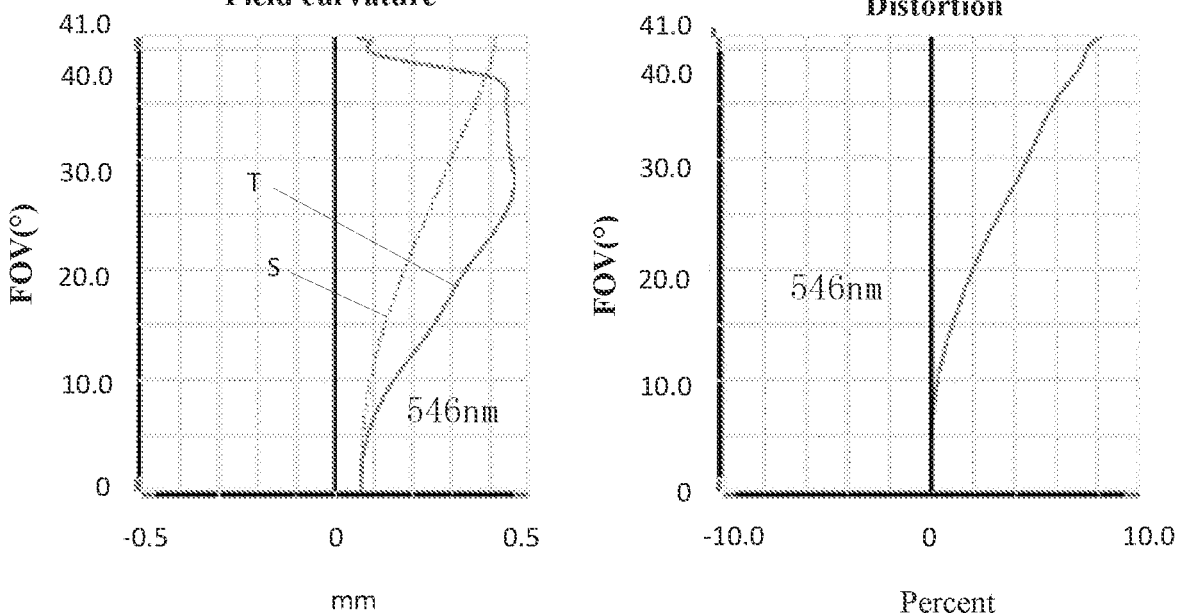
FIG. 20 is a schematic diagram of a field curvature and a distortion of the camera optical lens shown in FIG. 17.

FIG. 18 and FIG. 19 illustrate a longitudinal aberration and a lateral color of the lights having the wavelengths of 656 nm, 587 nm, 546 nm, 486 nm, and 436 nm after passing the camera optical lens 50 according to the fourth embodiment of the present disclosure, respectively. FIG. 20 illustrates a field curvature and a distortion of the light having the wavelength of 546 nm after passing the camera optical lens 50 according to the comparative embodiment of the present disclosure. A field curvature S in FIG. 20 is a field curvature in a sagittal direction, and T is a field curvature in a meridian direction.

The following table 21 lists numerical values corresponding to each conditional formula in the embodiment according to the above-mentioned conditional formulas. Obviously, the camera optical lens 50 of the embodiment does not satisfy the condition: $-8.00 \leq f2/f \leq -2.50$.

In the embodiment, an entrance pupil diameter is denoted as ENPD and the ENPD of the camera optical lens 50 is 3.319 mm. An image height is denoted as IH and the IH is 5.120 mm. A field of view is denoted as FOV and the FOV in the diagonal is 82.00 degree. The camera optical lens 50 meets the design requirements of the large aperture, wide-angle, and ultra-thinness, the on-axis and off-axis chromatic aberrations of which are fully corrected, and the camera optical lens 50 has excellent optical characteristics.

TABLE 21

| Parameters and conditions | Embodiment 1 | Embodiment 2 | Embodiment 3 | Embodiment 4 | Comparative Embodiment |
|---|---|---|---|---|---|
| f | 5.444 | 5.253 | 5.516 | 5.345 | 5.577 |
| f1 | 5.271 | 5.486 | 4.856 | 5.165 | 4.778 |
| f2 | −25.077 | −41.923 | −13.834 | −20.137 | −12.815 |
| f3 | −194.706 | −38.276 | −239.883 | 3819.150 | −245.760 |
| f4 | −69.076 | −158.339 | −775.339 | 615.050 | −388.872 |
| f5 | 38.228 | 24.714 | 43.245 | 54.060 | 52.887 |
| f6 | 7.961 | 8.233 | 5.462 | 8.232 | 8.426 |
| f7 | −4.001 | −5.401 | −4.013 | −3.826 | −4.108 |
| f2/f | −4.61 | −7.98 | −2.51 | −3.77 | −2.30 |
| (R5 + R6)/ (R5 − R6) | 15.44 | 2.51 | 29.98 | 9.27 | 29.94 |
| R8/ R7 | −1.57 | −3.93 | −9.69 | −271.44 | −1.50 |
| FNO | 1.68 | 1.68 | 1.68 | 1.68 | 1.68 |
| TTL | 6.139 | 6.141 | 6.259 | 6.128 | 6.178 |
| FOV | 85.20° | 87.00° | 84.20° | 86.00° | 82.00° |
| IH | 5.120 | 5.120 | 5.120 | 5.120 | 5.120 |

The above is only illustrates some embodiments of the present disclosure, in practice, one having ordinary skill in the art can make various modifications to these embodiments in forms and details without departing from the scope of the present disclosure.

What is claimed is:

1. A camera optical lens comprising, from an object side to an image side:
   a first lens with a positive refractive power;
   a second lens with a negative refractive power;
   a third lens;
   a fourth lens;
   a fifth lens with a positive refractive power;
   a sixth lens with a positive refractive power;
   a seventh lens with a negative refractive power; and
   wherein the camera optical lens satisfies the following conditions:

$-8.00 \leq f2/f \leq -2.50$;

$2.50 \leq (R5+R6)/(R5-R6) \leq 30.00$; and $R8/R7 \leq -1.50$;

where
   f denotes a focal length of the camera optical lens;
   f2 denotes a focal length of the second lens;
   R5 denotes a curvature radius of an object-side surface of the third lens;
   R6 denotes a curvature radius of an image-side surface of the third lens;
   R7 denotes a curvature radius of an object-side surface of the fourth lens; and
   R8 denotes a curvature radius of an image-side surface of the fourth lens.

2. The camera optical lens according to claim 1 further satisfying the following condition:

$3.00 \leq f5/f6 \leq 8.00$; and $R14/R13 \geq 2.00$;

where
   f5 denotes a focal length of the fifth lens;
   f6 denotes a focal length of the sixth lens;
   R13 denotes a curvature radius of an object-side surface of the seventh lens; and
   R14 denotes a curvature radius of an image-side surface of the seventh lens.

3. The camera optical lens according to claim 1, wherein, an object-side surface of the first lens is convex in a paraxial region, and an image-side surface of the first lens is concave in the paraxial region, the camera optical lens further satisfies the following conditions:

$0.44 <= f1/f <= 1.57$;

$-3.89 <= (R1+R2)/(R1-R2) <= -1.00$; and $0.07 <= d1/TTL <= 0.22$;

where f1 denotes a focal length of the first lens; R1 denotes a curvature radius of the object-side surface of the first lens; R2 denotes a curvature radius of the image-side surface of the first lens; d1 denotes an on-axis thickness of the first lens; and TTL denotes a total optical length from the object-side surface of the first lens to an image surface of the camera optical lens along an optical axis.

4. The camera optical lens according to claim 1, wherein, an image-side surface of the second lens is concave in the paraxial region, the camera optical lens further satisfies the following conditions:

$0.49 <= (R3+R4)/(R3-R4) <= 6.78$; and $0.02 <= d3/TTL <= 0.07$;

where R3 denotes a curvature radius of an object-side surface of the second lens; R4 denotes a curvature radius of the image-side surface of the second lens; d3 denotes an on-axis thickness of the second lens; and TTL denotes a total optical length from an object-side surface of the first lens to an image surface of the camera optical lens along an optical axis.

5. The camera optical lens according to claim 1, wherein, the camera optical lens further satisfies the following conditions:

$$-86.98 \leq f3/f \leq 1071.79; \text{ and}$$

$$0.02 \leq d5/TTL \leq 0.06;$$

where f3 denotes a focal length of the third lens;

d5 denotes an on-axis thickness of the third lens; and

TTL denotes a total optical length from an object-side surface of the first lens to an image surface of the camera optical lens along an optical axis.

6. The camera optical lens according to claim 1, wherein, the camera optical lens further satisfies the following conditions:

$$-281.12 \leq f4/f \leq 172.61;$$

$$-1.99 \leq (R7+R8)/(R7-R8) \leq -0.15; \text{ and}$$

$$0.03 \leq d7/TTL \leq 0.10;$$

Where f4 denotes a focal length of the fourth lens;

d7 denotes an on-axis thickness of the fourth lens; and

TTL denotes a total optical length from an object-side surface of the first lens to an image surface of the camera optical lens along an optical axis.

7. The camera optical lens according to claim 1, wherein, an object-side surface of the fifth lens is convex in a paraxial region, and an image-side surface of the fifth lens is concave in the paraxial region, the camera optical lens further satisfies the following conditions:

$$2.35 \leq f5/f \leq 15.17;$$

$$-11.48 \leq (R9+R10)/(R9-R10) \leq -2.60; \text{ and}$$

$$0.03 \leq d9/TTL \leq 0.10;$$

where f5 denotes a focal length of the fifth lens;

R9 denotes a curvature radius of the object-side surface of the fifth lens;

R10 denotes a curvature radius of the image-side surface of the fifth lens;

d9 denotes an on-axis thickness of the fifth lens; and

TTL denotes a total optical length from the object-side surface of the first lens to an image surface of the camera optical lens along an optical axis.

8. The camera optical lens according to claim 1, wherein, an object-side surface of the sixth lens is convex in a paraxial region, and an image-side surface of the sixth lens is concave in the paraxial region, the camera optical lens further satisfies the following conditions:

$$0.50 \leq f6/f \leq 2.35;$$

$$-9.21 \leq (R11+R12)/(R11-R12) \leq -2.57; \text{ and}$$

$$0.02 \leq d11/TTL \leq 0.08;$$

where f6 denotes a focal length of the sixth lens;

R11 denotes a curvature radius of the object-side surface of the sixth lens;

R12 denotes a curvature radius of the image-side surface of the sixth lens;

d11 denotes an on-axis thickness of the sixth lens; and

TTL denotes a total optical length from an object-side surface of the first lens to an image surface of the camera optical lens along an optical axis.

9. The camera optical lens according to claim 1, wherein, an object-side surface of the seventh lens is concave in a paraxial region, and an image-side surface of the seventh lens is convex in the paraxial region, the camera optical lens further satisfies the following conditions:

$$-2.06 \leq f7/f \leq -0.48;$$

$$-5.97 \leq (R13+R14)/(R13-R14) \leq -0.67; \text{ and}$$

$$0.03 \leq d13/TTL \leq 0.13;$$

where f7 denotes a focal length of the seventh lens;

R13 denotes a curvature radius of the object-side surface of the seventh lens;

R14 denotes a curvature radius of the image-side surface of the seventh lens;

d13 denotes an on-axis thickness of the seventh lens; and

TTL denotes a total optical length from an object-side surface of the first lens to an image surface of the camera optical lens along an optical axis.

10. The camera optical lens according to claim 1, wherein at least one of the first lens, the third lens, the fourth lens, the fifth lens, the sixth lens and the seventh lens is made of glass.

* * * * *